(12) United States Patent
Park et al.

(10) Patent No.: US 10,976,882 B2
(45) Date of Patent: Apr. 13, 2021

(54) ELECTRONIC DEVICE INCLUDING PRESSURE SENSOR

(71) Applicant: Samsung Electronics Co., Ltd., Suwon-si (KR)

(72) Inventors: Kyungwan Park, Suwon-si (KR); Han-Vit Kang, Suwon-si (KR); Ho-Kyung Kang, Daegu (KR); Byeong-Cheol Kim, Suwon-si (KR); Jung Won Kim, Hwaseong-si (KR); Jeongsik Jeong, Hwaseong-si (KR); Kwang-Tai Kim, Yongin-si (KR); Hyungsup Byeon, Suwon-si (KR); Hyun-Ju Hong, Osan-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 48 days.

(21) Appl. No.: 16/324,858

(22) PCT Filed: Jun. 23, 2017

(86) PCT No.: PCT/KR2017/006643
§ 371 (c)(1),
(2) Date: Feb. 11, 2019

(87) PCT Pub. No.: WO2018/030634
PCT Pub. Date: Feb. 15, 2018

(65) Prior Publication Data
US 2019/0171315 A1 Jun. 6, 2019

(30) Foreign Application Priority Data
Aug. 9, 2016 (KR) .................. 10-2016-0101140

(51) Int. Cl.
*G09G 5/00* (2006.01)
*G06F 3/044* (2006.01)
*G06F 3/041* (2006.01)

(52) U.S. Cl.
CPC ............ *G06F 3/0447* (2019.05); *G06F 3/041* (2013.01); *G06F 3/0412* (2013.01);
(Continued)

(58) Field of Classification Search
CPC .... G06F 3/03547; G06F 3/0412; G06F 3/044; G06F 3/0414; G06F 2203/04102;
(Continued)

(56) References Cited

U.S. PATENT DOCUMENTS

2013/0083496 A1  4/2013 Franklin et al.
2013/0307816 A1* 11/2013 Lee ................... G06F 1/1684
                                                      345/174
(Continued)

FOREIGN PATENT DOCUMENTS

KR  10-2014-0099139 A   8/2014
KR  10-1473312 B1       12/2014
(Continued)

OTHER PUBLICATIONS

ISA/KR, "International Search Report and Written Opinion of the International Searching Authority," International Application No. PCT/KR2017/006643, dated Oct. 26, 2017, 23 pages.
(Continued)

*Primary Examiner* — Jennifer T Nguyen

(57) ABSTRACT

An electronic device according to various examples comprises: a housing, in an unfolded state, including a first surface facing a first direction and a second surface facing a second direction opposite to the first direction and including at least one flexible portion; a touch screen display arranged between the first surface and the second surface of the
(Continued)

housing, exposed through the first surface of the housing, and when viewed from above the first surface, including at least one flexible portion at a position corresponding to the flexible portion of the housing; and a pressure sensor arranged between the touch screen display and the second surface of the housing, and when viewed from above the first surface, including at least one flexible portion at a position corresponding to the flexible portion of the housing. The pressure sensor comprises: a first electrode layer formed substantially in parallel to the touch screen display; a second electrode layer spaced apart from the first electrode layer in the second direction and formed substantially in parallel to the first electrode layer; and a dielectric layer arranged between the first electrode layer and the second electrode layer. Other examples are also possible.

16 Claims, 26 Drawing Sheets

(52) U.S. Cl.
CPC .. *G06F 3/0445* (2019.05); *G06F 2203/04102* (2013.01); *G06F 2203/04112* (2013.01)

(58) Field of Classification Search
CPC ......... G06F 3/0416; G06F 2203/04104; G06F 2203/04105; G06F 1/1637
USPC .......................................... 345/173
See application file for complete search history.

(56) References Cited

U.S. PATENT DOCUMENTS

| | | |
|---|---|---|
| 2014/0042406 A1 | 2/2014 | Degner et al. |
| 2014/0226275 A1 | 8/2014 | Ko et al. |
| 2014/0354558 A1 | 12/2014 | Cho et al. |
| 2015/0145824 A1 | 5/2015 | Park et al. |
| 2015/0253883 A1* | 9/2015 | Takano ................. G06F 3/0414 345/173 |
| 2015/0293631 A1 | 10/2015 | Bernstein et al. |
| 2016/0011708 A1* | 1/2016 | Chung, II ............ G06F 3/0414 345/174 |
| 2016/0179253 A1 | 6/2016 | Franklin et al. |
| 2016/0179268 A1 | 6/2016 | Hong |
| 2016/0195902 A1* | 7/2016 | Huh ........................ G06F 3/017 345/156 |
| 2017/0075467 A1* | 3/2017 | Kim ........................ G01L 1/148 |
| 2017/0092884 A1* | 3/2017 | Zhang ................... G06F 3/0412 |

FOREIGN PATENT DOCUMENTS

| | | |
|---|---|---|
| KR | 10-2015-0036443 A | 4/2015 |
| KR | 10-2015-0059331 A | 6/2015 |
| KR | 10-2016-0022388 A | 2/2016 |
| KR | 10-2016-0074805 A | 6/2016 |

OTHER PUBLICATIONS

Supplementary European Search Report dated Jun. 17, 2019 in connection with European Patent Application No. 17 83 9652, 12 pages.

* cited by examiner

ELECTRONIC DEVICE INCLUDING PRESSURE SENSOR

CROSS-REFERENCE TO RELATED APPLICATIONS

This application is a 371 National Stage of International Application No. PCT/KR2017/006643, filed Jun. 23, 2017, which claims priority to Korean Patent Application No. 10-2016-0101140, filed Aug. 9, 2016, the disclosures of which are herein incorporated by reference in their entirety.

BACKGROUND

1. Field

Various embodiments of the present disclosure relate to an electronic device including a pressure sensor which is utilized as an input means.

2. Description of Related Art

In general, electronic devices are provided with various functions and perform complex functions. For example, an electronic device may perform a mobile communication function, a data communication function, an image photographing function, or a voice recording function. An electronic device may provide a user interaction through various input means. In particular, it is a recent trend to apply a pressure sensor (or a force sensor) for detecting an intensity of pressure to an electronic device as a new input means.

SUMMARY

When an electronic device including a touch screen display including a pressure sensor is a flexible device or a foldable device, delamination may occur between respective layers included in the touch screen display. In addition, a crack or buckling may occur in an electrode or a wire included in the pressure sensor.

According to various embodiments of the present disclosure, an electronic device may include: a housing including, in an unfolded state, a first surface facing a first direction and a second surface facing a second direction opposite to the first direction, the housing including at least one flexible portion; a touch screen display arranged between the first surface and the second surface of the housing, and exposed through the first surface of the housing, and including at least one flexible portion on a position corresponding to the flexible portion of the housing when viewed from above the first surface; and a pressure sensor arranged between the touch screen display and the second surface of the housing, and including at least one flexible portion on a position corresponding to the flexible portion of the housing when viewed above the first surface, wherein the pressure sensor includes: a first electrode layer formed in substantially parallel with the touch screen display; a second electrode layer spaced apart from the first electrode layer in the second direction, and formed in substantially parallel with the first electrode layer; and a dielectric layer arranged between the first electrode layer and the second electrode layer.

According to various embodiments of the present disclosure, when an electronic device including a pressure sensor is a flexible device or a foldable device, delamination can be prevented from occurring between layers included in a touch screen display. In addition, a crack or buckling can be prevented from occurring in an electrode or a wire included in the pressure sensor.

DETAILED DESCRIPTION

Figure 1:
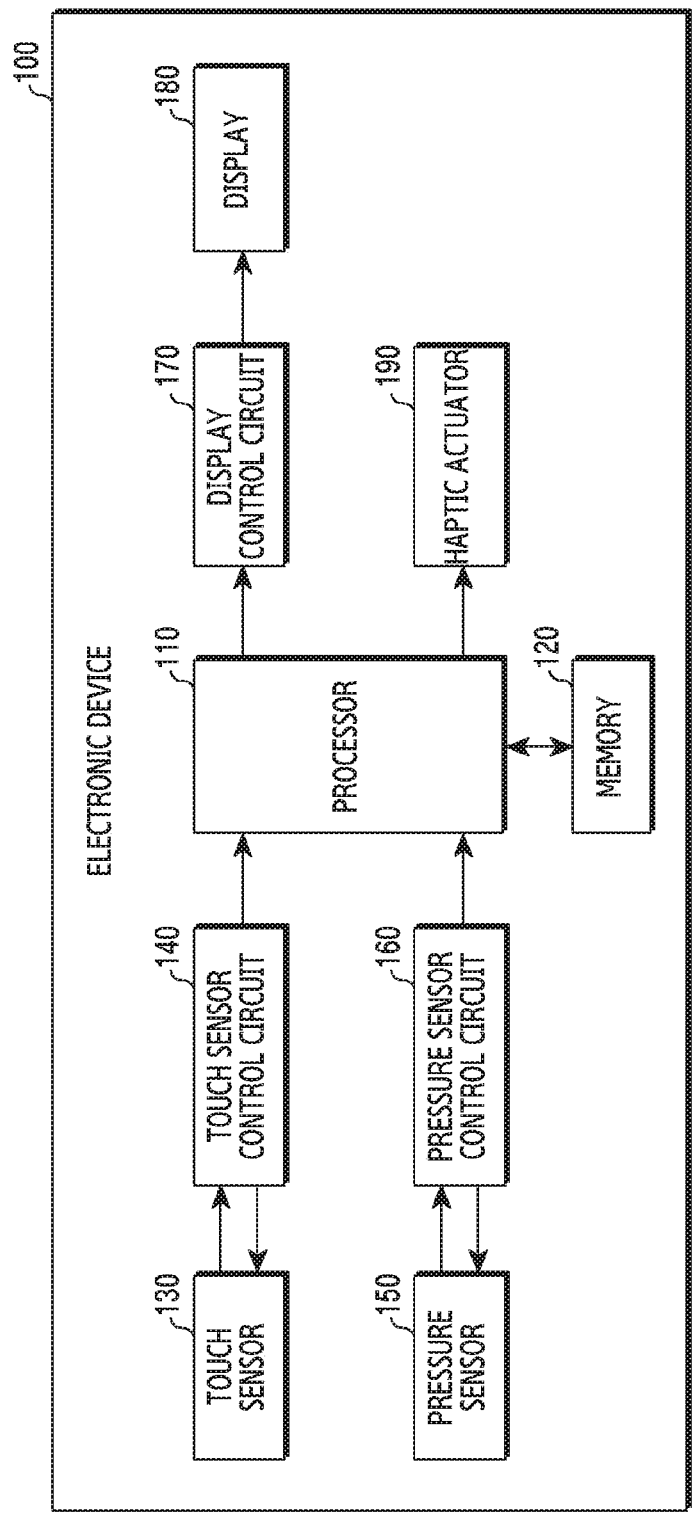
FIG. 1 is a block diagram of an electronic device according to various embodiments of the present disclosure.

Hereinafter, various embodiments of the present disclosure will be described with reference to the accompanying drawings. It should be appreciated that various embodiments of the present disclosure and the terms used therein are not intended to limit the technological features set forth herein to particular embodiments, and include various changes, equivalents, and/or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B" or "at least one of A and/or B" may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly or via another element (e.g., a third element).

The term "configured (or set) to . . . " used in the present disclosure may be interchangeably used with the terms "suitable for . . . ," "having the capacity to . . . ," "adapted to . . . ," "made to . . . ," or "capable of . . . ," or "designed to . . . " in a hardware or software level depending on the situation. In a certain situation, the term "a device configured to . . . " may refer to "the device being capable of . . . " with another device or parts. For example, "a processor configured (set) to perform A, B, and C" may refer, for example, and without limitation, to a dedicated processor (for example, an embedded processor) for performing a corresponding operation, or a generic-purpose processor (for example, a central processing unit (CPU) or an application processor (AP)), or the like, for performing corresponding operations by executing one or more software programs stored in a memory device.

An electronic device according to various embodiments of the present disclosure may include at least one of smartphones, tablet personal computers (PCs), mobile phones, video telephones, electronic book readers, desktop PCs, laptop PCs, netbook computers, workstations, servers, PDAs, portable multimedia players (PMPs), Motion Picture Experts Group (MPEG-1 or MPEG-2) Audio Layer 3 (MP3) players, medical devices, cameras, or wearable devices, or the like. The wearable devices may include at least one of accessories (for example, watches, rings, bracelets, ankle bracelets, necklaces, glasses, contact lenses, head-mounted-devices (HMDs), etc.), fabric- or clothing-mounted devices (for example, electronic apparels), body-mounted devices (for example, skin pads, tattoos, etc.), bio-implantable circuits, or the like. According to some embodiments, the electronic devices may include at least one of, for example, televisions (TVs), digital video disk (DVD) players, audios, refrigerators, air conditioners, cleaners, ovens, microwave ovens, washing machines, air cleaners, set-top boxes, home automation control panels, security control panels, media boxes (for example, Samsung HomeSync™, Apple TV™, or Google TV™), game consoles (for example, Xbox™ and PlayStation™), electronic dictionaries, electronic keys, camcorders, electronic picture frames, or the like.

According to another embodiment, the electronic devices may include at least one of medical devices (for example, various portable medical measurement devices (for example, a blood glucose monitoring device, a heartbeat measuring device, a blood pressure measuring device, a body temperature measuring device, and the like), a magnetic resonance angiography (MRA), a magnetic resonance imaging (MRI), a computed tomography (CT), scanners, and ultrasonic devices), navigation devices, global navigation satellite systems (GNSS), event data recorders (EDRs), flight data recorders (FDRs), vehicle infotainment devices, electronic equipment for vessels (for example, navigation systems and gyrocompasses), avionics, security devices, head units for vehicles, industrial or home robots, drones, automatic teller's machines (ATMs) of financial institutions, points of sales (POSs) of stores, or internet of things (for example, light bulbs, various sensors, sprinkler devices, fire alarms, thermostats, street lamps, toasters, exercise equipment, hot water tanks, heaters, boilers, and the like), or the like. According to some embodiments, the electronic devices may include at least one of furniture, a part of buildings/structures or cars, electronic boards, electronic signature receiving devices, projectors, or various measuring instruments (for example, water meters, electricity meters, gas meters, or wave meters, and the like), or the like. The electronic devices according to various embodiments may be flexible or may be a combination of two or more devices of the above-mentioned devices. Also, electronic devices according to various embodiments of the present disclosure are not limited to the above-mentioned devices. In the present disclosure, the term "user" may refer to a person who uses the electronic device or a device that uses the electronic device (for example, an artificial intelligence electronic device).

FIG. 1 is a block diagram of an electronic device according to various embodiments.

The electronic device 100 according to various embodiments may include, for example, one or more processors (for example, an application processor (AP)) 110, a memory 120, a touch sensor 130, a touch sensor control circuit 140, a pressure sensor (or a "force sensor" interchangeably used hereinafter) 150, a pressure sensor control circuit 160, a display 180, a display control circuit 170, and a haptic actuator 190. In some embodiments, the electronic device 100 may omit at least one of the elements or may further include other element(s).

The processor 110 may include one or more of a central processing device, an application processor, or a communication processor (CP). The processor 110 may perform, for example, an operation or data processing associated with control and/or communication of at least one other element(s) of the electronic device 100. The processor 110 may drive an operating system or an application program, and may control a plurality of hardware or software elements connected to the processor 110, and may perform various data processing and operations. The processor 110 may be implemented as a system on chip (SoC). According to an embodiment, the processor 110 may further include a graphic processing unit (GPU) and/or an image signal processor.

The processor 110 may receive a position signal (for example, coordinates (X,Y)) detected at the touch sensor 130 from the touch sensor control circuit 140. The processor 110 may receive a pressure signal (for example, a pressure coordinate (Z) or an intensity of pressure (Z)) detected at the pressure sensor 150 from the pressure sensor control circuit 160. The processor 110 may synchronize the position signal of the touch sensor 130 and the pressure signal of the pressure sensor 150. The processor 120 should process the touch signal and the pressure signal altogether, but the entities detecting generation of the signals are the touch sensor 130 and the pressure sensor 150, which are different. Therefore, the processor 110 may synchronize the two signals. For example, the touch signal may be a signal that is detected when the display 180 is touched, and may be generated without the pressure signal. However, the pressure signal may be a signal that is detected when the user touches the display 180 and more strongly presses against the display 180. Therefore, only the pressure signal may not be generated without the touch signal. Accordingly, when the pressure signal is generated, the processor 110 may synchronize the touch signal and the pressure signal and may process the signals as a single input.

The processor 110 may transmit image information to the display control circuit 170, and the display control circuit 170 may transmit a driving signal for driving the display 180 according to the image information to the display 180. The processor 110 may transmit haptic information to the haptic actuator 190.

The memory 120 may include a volatile and/or nonvolatile memory. The memory 120 may store commands or data associated with at least one other element(s) of the electronic device 100. According to an embodiment, the memory 120 may store software and/or a program. The program may include, for example, a kernel, a middleware, an application programming interface (API), and/or an application program (or an "application"). At least a portion of the kernel, the middleware, or the API may be called an "operating system (OS)." The kernel may control or manage system resources (for example, a bus, the processor 110, or memory 120) that are used to execute operations or functions of other programs (for example, the API or the application program). Furthermore, the kernel may provide an interface that allows the middleware, the API, or the application program to access discrete elements of the electronic device 100 so as to control or manage system resources.

The memory 120 (for example, the memory 120) may include, for example, an internal memory or an external memory. For example, the internal memory may include at least one of a volatile memory (for example, a dynamic random access memory (DRAM), a static RAM (SRAM), or a synchronous DRAM (SDRAM)), and a nonvolatile memory (for example, a one-time programmable read only memory (OTPROM), a programmable ROM (PROM), an erasable and programmable ROM (EPROM), an electrically erasable and programmable ROM (EEPROM), a mask ROM, a flash ROM, a flash memory, a hard drive, or a solid state drive (SSD)). The external memory may include a flash drive, for example, compact flash (CF), secure digital (SD), micro secure digital (Micro-SD), mini secure digital (Mini-SD), extreme digital (xD), multimedia card (MMC), a memory stick, or the like. The external memory may be functionally or physically connected to the electronic device 100 through various interfaces.

The touch sensor 130 may detect two-dimensional coordinates. The touch sensor 130 may detect a touch position (X, Y). The touch sensor 130 may use at least one method of capacitive, resistive, infrared ray, or ultrasonic method. The touch sensor 130 may further include a tactile layer, and may provide a tactile response to a user. The touch sensor 130 may be embedded in the display 180 and may be implemented as a touch screen display.

The touch sensor control circuit 140 may be electrically connected with the touch sensor 130. The touch sensor control circuit 140 may drive the touch sensor 130. For example, the touch sensor control circuit 140 may apply a driving signal to the touch sensor 130, or may receive a driving signal from the touch sensor 130. The touch sensor control circuit 140 may transmit the touch position (X, Y) detected from the touch sensor 130 to the processor 110.

The pressure sensor 150 may detect the intensity of pressure on a user's touch. The pressure sensor 150 may detect a pressure value (Z) at the touch position (X, Y). The pressure sensor 150 may detect a pressure of an external object through a first electrode and a second electrode which are insulated from each other by a dielectric layer.

The pressure sensor control circuit 160 may detect the intensity of pressure, based on a change in a capacitance formed between the first electrode and the second electrode when the first electrode and the second electrode come closer to each other by the pressure of the object. The pressure sensor control circuit 160 may detect the change of the capacitance formed between the first electrode and the second electrode according to a mutual capacitance method and/or a self capacitance method. When the mutual capacitance method is used, the pressure sensor control circuit 160 may apply a transmission signal to the second electrode, and may receive a reception signal corresponding to the transmission signal through the first electrode. When the self capacitance method is used, the pressure sensor control circuit 160 may apply a stimulus signal to one of the first electrode or the second electrode, and may connect the other one of the first electrode or the second electrode to the ground. The pressure sensor control circuit 160 may transmit the intensity of pressure detected from the pressure sensor 150 to the processor 110.

The display 180 may include, for example, a liquid crystal display (LCD), a light-emitting diode (LED) display, an organic LED (OLED) display, a microelectromechanical systems (MEMS) display, or an electronic paper display. The display 180 may display, for example, various contents (for example, a text, an image, a video, an icon, and/or a symbol) to the user. The display 180 may include a touch screen and may receive, for example, a touch, gesture, approach, or hovering input using an electronic pen or a portion of a user's body.

The display control circuit 170 may receive image information from the processor 110. The display control circuit 170 may transmit, to the display 180, a driving signal for driving the display 180 according to the received image information.

The haptic actuator 190 may convert an electric signal into a mechanical vibration, and may generate a vibration or a haptic effect. When the user presses the electronic device 100, the haptic actuator 190 may provide a sense of pressing to the user. The haptic actuator 190 may receive haptic information from the processor 110. The haptic actuator 190 may generate a vibration or a haptic effect according to the received haptic information.

For example, the electronic device 100 may include a mobile TV supporting device (for example, a GPU) for processing media data according to the standards of digital multimedia broadcasting (DMB), digital video broadcasting (DVB), or MediaFlo™. Each of the elements described in the present disclosure may be configured with one or more components, and the names of the elements may be changed according to the type of the electronic device. According to various embodiments, some elements of the electronic device (for example, the electronic device 100) may be omitted or other additional elements may be added. Furthermore, some of the elements may be combined with each other so as to form one entity, and the functions of the elements may be performed in the same manner as before being combined.

Figure 2A:
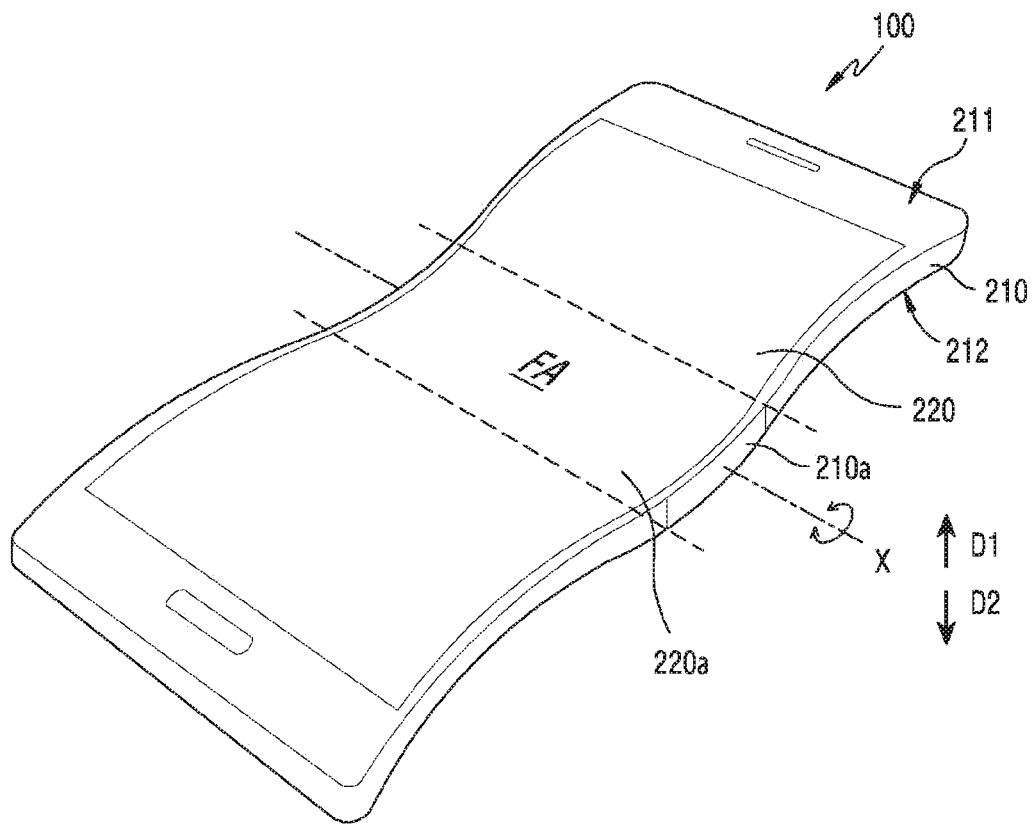
FIG. 2A is a perspective view of an electronic device which is opened according to various embodiments of the present disclosure.
Figure 2B:
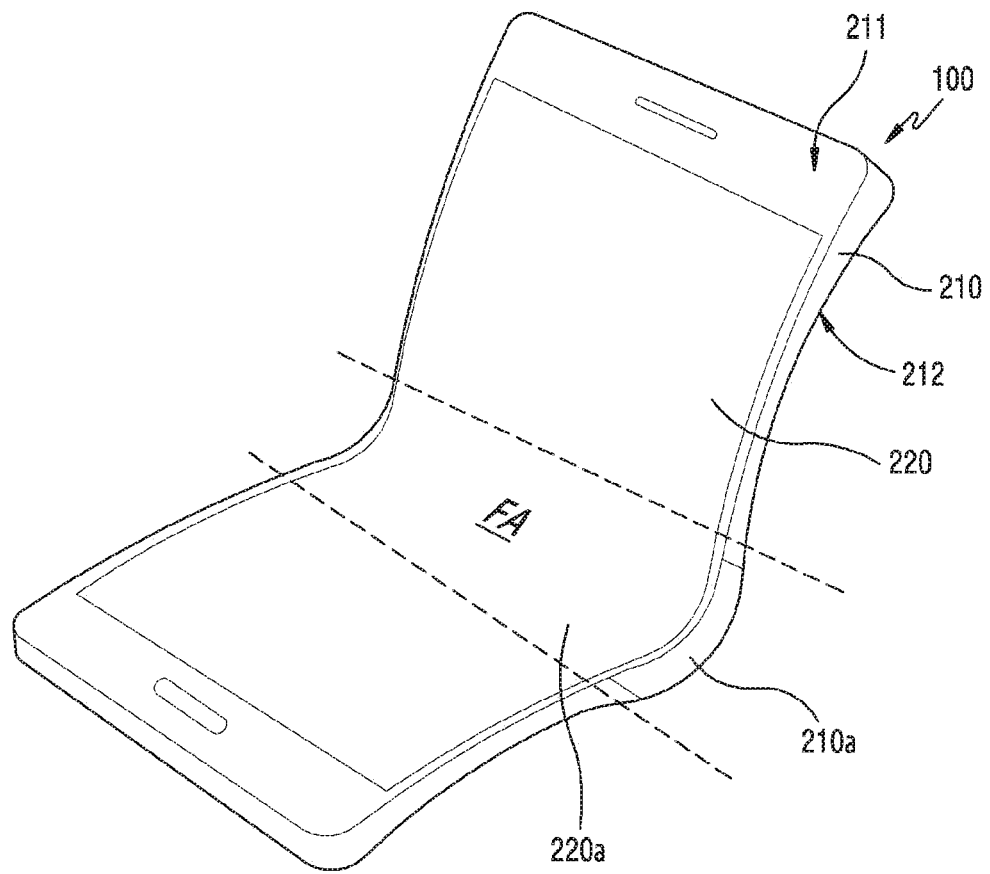
FIG. 2B is a perspective view of the electronic device which is opened at a predetermined angle according to various embodiments of the present disclosure.
Figure 2C:
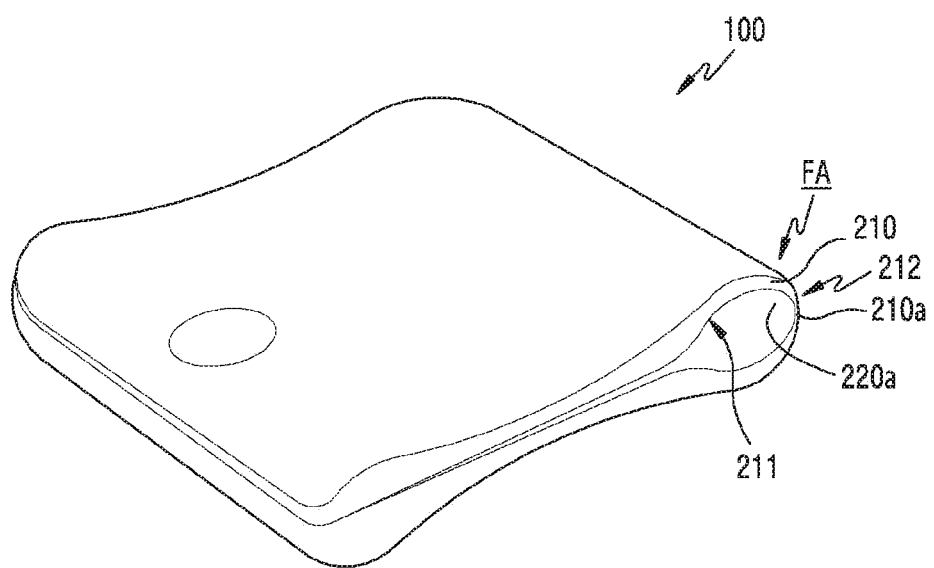
FIG. 2C is a perspective view of the electronic device which is folded according to various embodiments of the present disclosure.

FIG. 2A is a perspective view of an electronic device which is opened according to various embodiments of the present disclosure. FIG. 2B is a perspective view of the electronic device which is opened at a predetermined angle according to various embodiments. FIG. 2C is a perspective view of the electronic device which is folded according to various embodiments of the present disclosure.

According to various embodiments, as shown in FIGS. 2A, 2B, and 2C, the electronic device 100 may be a foldable electronic device which can be folded and unfolded. The electronic device 100 may include at least one flexible area (FA). The electronic device 100 may be bent or folded through the flexible area (FA). For example, the electronic device 100 may turn about an X axis on the drawing and may be bent or folded through the FA. The electronic device 100 may be bent or folded with respect to the rotation axis of the X axis.

According to various embodiments, the electronic device 100 may include a housing 210 and a touch screen display 220. The housing 210 may include, in an unfolded state, a first surface 211 facing a first direction D1, and a second surface 212 facing a second direction D2 opposite to the first surface 211. The first surface 211 may correspond to a front surface of the electronic device 100, and for example, may be a surface on which a user interface is displayed through the touch screen display 220. The second surface 212 may correspond to a rear surface (or bottom surface) of the electronic device 100. At least part of the housing 210 of the electronic device 100 may include a flexible portion 210a to be bendable or foldable. The flexible portion 210a of the housing 210 may correspond to the FA of the electronic device 100.

According to various embodiments, the touch screen display 220 may be arranged between the first surface 211 and the second surface 212 of the housing 210. The touch screen display 220 may be exposed through the first surface 211 of the housing 210. When viewed from the first surface 211, the touch screen display 220 may include at least one flexible portion 220a on a position corresponding to the flexible portion 210a of the housing 210. The flexible portion 220a of the touch screen display 220 may correspond to the FA of the electronic device 100. The electronic device 100 which is bendable or foldable through the flexible portion 220a of the touch screen display 220 may be implemented.

It is illustrated in FIGS. 2A, 2B, and 2C that the electronic device 100 is of an in-folding type to have the first surface 211 of the housing 210 folded to face each other. However, embodiments are not limited thereto, and the electronic device 100 may be of an out-folding type to have the second surface 212 of the housing 210 folded to face each other.

It is illustrated in FIGS. 2A, 2B, and 2C that the electronic device 100 is a smartphone. However, embodiments are not limited thereto. The electronic device 100 may be one of the above-described various devices or a combination of one or more of them.

Figure 3A:
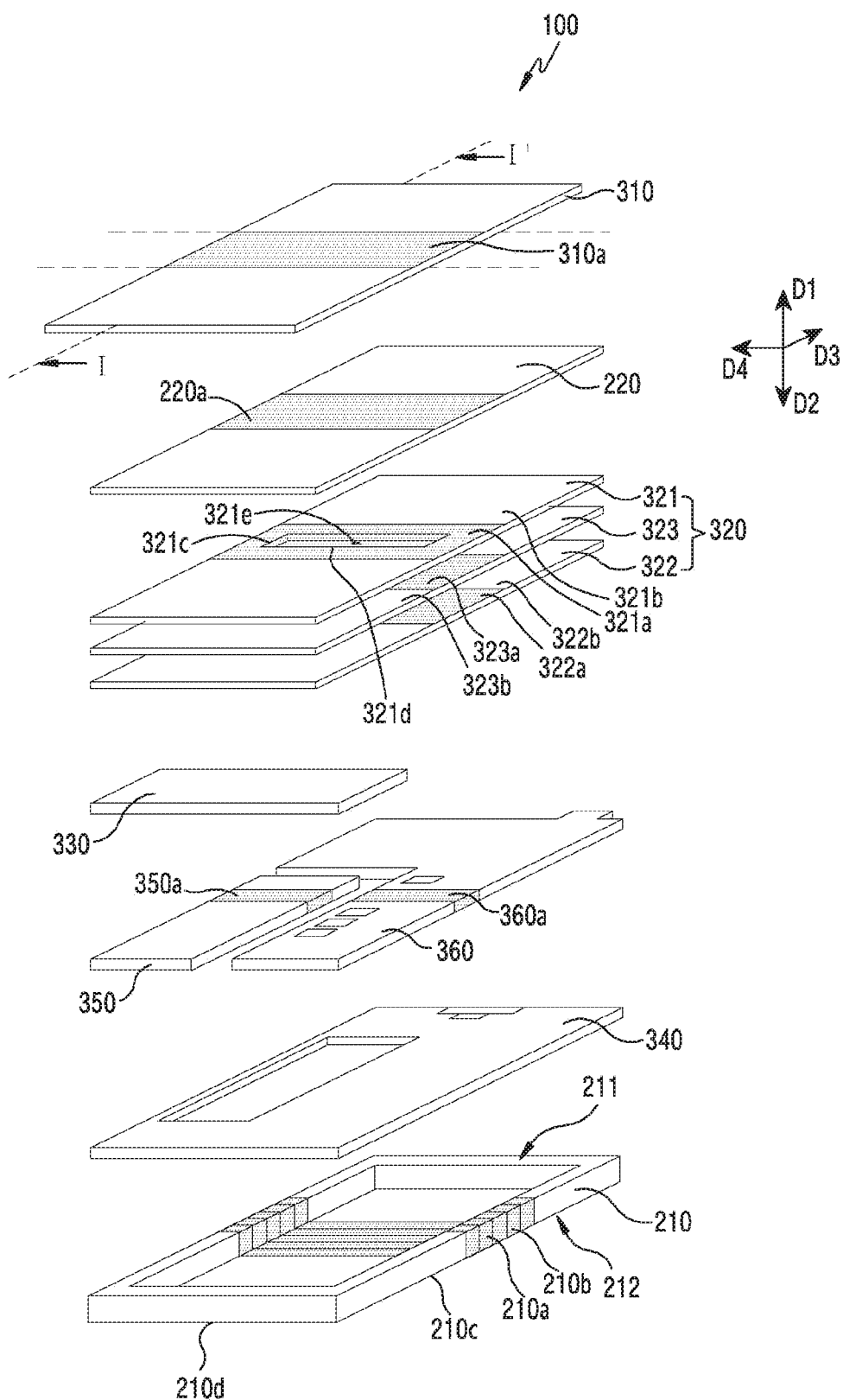
FIG. 3A is an exploded perspective view of an electronic device according to various embodiments.
Figure 3B:
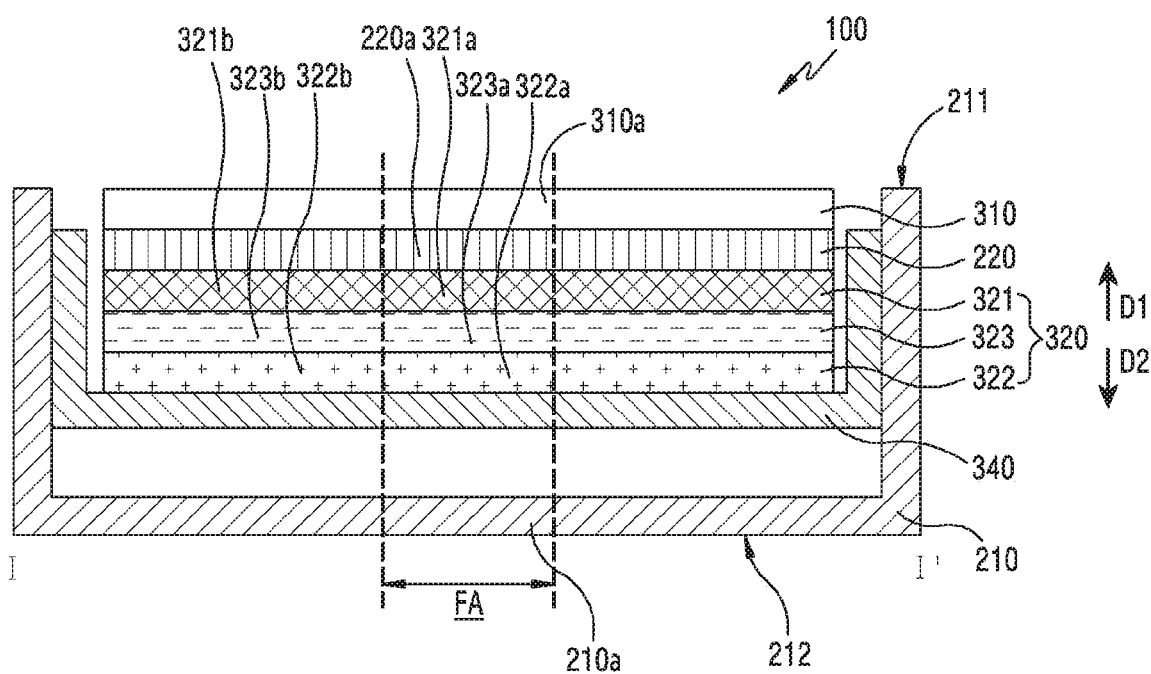
FIG. 3B is a cross-sectional view taken on line I-I' of FIG. 3A.

FIG. 3A is an exploded perspective view of an electronic device according to various embodiments. FIG. 3B is a cross-sectional view taken on line I-I' of FIG. 3A.

According to various embodiments, as shown in FIGS. 3A and 3B, the electronic device 100 may include a housing 210, a transparent cover 310, a touch screen display 220, a pressure sensor 320, a haptic actuator 330, a battery 350, a printed circuit board 360, and/or an internal support structure 340.

According to various embodiments of the present disclosure, the housing 210 may accommodate the touch screen display 220, the pressure sensor 320, and/or the haptic actuator 330. The housing 210 may be formed with metal such as aluminum, stainless steel, titanium (Ti), or synthetic resins such as plastic. The housing 210 may include a flexible portion 210a corresponding to the FA of the electronic device 100. The flexible portion 210a of the housing 210 may include a material different from that of the other portion of the housing 210 at least in part. For example, the flexible portion 210a of the housing 210 may include at least one hinge structure 210b configured to provide flexibility. For example, the hinge structure 210b may be arranged on various surfaces of the first surface 211, the second surface 212 or side surfaces of the housing 210. Through the hinge structure 210b, the housing (21) may be foldable in the first direction D1 or the second direction D2.

According to various embodiments of the present disclosure, the transparent cover 310 may form at least part of the first surface 211 of the housing 210. The transparent cover 310 may form an exterior of the electronic device 100. The transparent cover 310 may be arranged on an upper portion of the electronic device 100. The transparent cover 310 may protect various elements arranged thereunder. The transparent cover 310 may transmit internal light generated inside the electronic device 100 to the outside. For example, the transparent cover 310 is transparent to expose the touch screen display 220. In addition, the transparent cover 310 may transmit externa light entering from the outside of the electronic device 100 to the inside of the electronic device 100. The transparent cover 310 may include a flexible portion 310a corresponding to the FA of the electronic device 100.

According to various embodiments of the present disclosure, the transparent cover 310 may be formed with a material which is excellent in terms of light transmissivity, thermal resistance, chemical resistance, and mechanical strength. The transparent cover 310 may be a transparent film formed with polymer or a glass substrate, for example. For example, the transparent cover 310 may include any one or a combination of two or more selected from acrylonitrile butadiene styrene (ABS), acrylic, polycarbonate (PC), polymethyl methacrylate (PMMA), polyimide (PE), polyethylene terephthalate (PET), polypropylene terephthalate (PPT), amorphous polyethylene terephthalate (APET), polyethylene naphthalate terephthalate (PEN), polyethylene terephthalate glycol (PETG), tri-acetyl-cellulose (TAC), cyclic olefin polymer (COP), cyclic olefin copolymer (COC), polydicyclopentadiene (DCPD), cyclopentdienyl anions (CPD), polyarylate (PAR), polyethersulfone (PES), poly ether imide (PEI), modified epoxy resin, or acrylic resin. Alternatively, the transparent cover 310 may be various high hardness films. When the transparent cover 310 is a high hardness film, coating of a surface treated portion may be hard coating. The flexible portion 310a of the transparent cover 310 may include a material different from that of the other portion of the transparent cover 310 at least in part.

According to various embodiments of the present disclosure, the touch screen display 220 may correspond to the display 180 described in FIG. 1. The touch screen display 220 may perform a function of displaying an image. The touch screen display 220 may have a touch sensor embedded therein to detect a touch point by an external object. However, embodiments are not limited thereto, and the touch sensor may be formed as a separate element from the display. The touch screen display 220 may include a flexible portion 220a corresponding to the FA of the electronic device 100. The flexible portion 220a of the touch screen display 220 may include a material different from that of the other portion of the touch screen display 220 at least in part.

According to various embodiments of the present disclosure, the pressure sensor 320 may be arranged between the touch screen display 220 and the second surface 212 of the housing 210. The pressure sensor 320 may not overlap the at least one flexible portion 210a of the housing 210 at least in part when viewed above the first surface 211 of the housing 210. The pressure sensor 320 may detect a pressure of an external object against the first surface 211. The pressure sensor 320 may include a first electrode layer 321, a second electrode layer 322, and a dielectric layer 323.

The first electrode layer 321 may be formed in substantially parallel with the touch screen display 220. The first electrode layer 321 may include a first portion 321a corresponding to the FA of the electronic device 100, and a second portion 321b which is different from the first portion 321a. For example, the first portion 321a may have flexibility of a first degree when viewed above the first surface 211. The second portion 321b may have flexibility of a second degree when viewed above the first surface 211. The first portion 321a may include a material different from that of the second portion 321b at least in part. Alternatively, the first portion 321a may include a configuration different from that of the second portion 321b at least in part.

The second electrode layer 322 may be spaced apart from the first electrode layer 321 in the second direction D2, and may be formed in substantially parallel with the first electrode layer 321. The second electrode layer 322 may include a first portion 322a corresponding to the FA of the electronic device 100, and a second portion 322b which is different from the first portion 322a. For example, the first portion 322a may have the flexibility of the first degree when viewed above the first surface 211. The second portion 322b may have the flexibility of the second degree when viewed above the first surface 211. The first portion 322a may include a material different from that of the second portion 322b at least in part. Alternatively, the first portion 322a may include a configuration different from that of the second portion 322b at least in part.

The dielectric layer 323 may be arranged between the first electrode layer 321 and the second electrode layer 322. The dielectric layer 323 may include a first portion 323a corresponding to the FA of the electronic device 100, and a second portion 323b which is different from the first portion 323a. For example, the first portion 323a may have the flexibility of the first degree when viewed above the first surface 211. The second portion 323b may have the flexibility of the second degree when viewed above the first surface 211. The first portion 323a may include a material different from that of the second portion 323b at least in part. Alternatively, the first portion 323a may include a configuration different from that of the second portion 323b at least in part.

The dielectric layer 323 may insulate the first electrode layer 321 and the second electrode layer 322. The dielectric layer 323 may include an insulation material. For example, the dielectric layer 323 may include any one or a combination of two or more selected from silicon, air, foam, membrane, double-sided adhesion film, pressure sensitive adhesive (PAS), optically clear adhesive (OCA), optical clear resin (OCR), sponge, rubber, ink, acrylonitrile butadiene styrene (ABS), acrylic, polycarbonate (PC), polymethylmethacrylate (PMMA), polyimide (PE), polyethylene terephthalate (PET), polypropylene terephthalate (PPT), amorphous polyethylene terephthalate (APET), polyethylene naphthalate terephthalate (PEN), polyethylene terephthalate glycol (PETG), tri-acetyl-cellulose (TAC), cyclic olefin polymer (COP), cyclic olefin copolymer (COC), polydicyclopentadiene (DCPD), cyclopentdienyl anions (CPD), polyarylate (PAR), polyethersulfone (PES), poly ether imide (PEI), modified epoxy resin, or acrylic resin.

According to various embodiments, the first electrode layer 321 and the second electrode layer 322 insulated from each other by the dielectric layer 323 may be used to detect a pressure of an external object. For example, a pressure sensor control circuit (for example, the pressure sensor control circuit 160 of FIG. 1) may detect an intensity of pressure, based on a change in a capacitance formed between the first electrode layer 321 and the second electrode layer 322 when the first electrode layer 321 and the second electrode layer 322 come closer to each other by the pressure of the external object. The pressure sensor control circuit 160 shown in FIG. 1 may detect the change of the capacitance formed between the first electrode layer 321 and the second electrode layer 322 according to a mutual capacitance method and/or a self capacitance method. When the mutual capacitance method is used, the pressure sensor control circuit 160 may apply a transmission signal to the second electrode layer 322, and may receive a reception signal corresponding to the transmission signal through the first electrode layer 321. When the self capacitance method is used, the pressure sensor control circuit 160 may apply a stimulus signal to one of the first electrode layer 321 or the second electrode layer 322, and may connect the other one of the first electrode layer 321 or the second electrode layer 322 to the ground.

According to various embodiments of the present disclosure, at least one of the first electrode layer 321, the second electrode layer 322, or the dielectric layer 323 may include at least one of a recess, an opening, a crack, or a gap. A least one of the first portion 321a of the first electrode layer 321, the first portion 322a of the second electrode layer 322, or the first portion 323a of the dielectric layer 323 may include a recess, an opening, a crack, or a gap.

For example, the first portion 321a of the first electrode layer 321 may include an opening 321e. The housing 210 may include a first side 210c which is extended in a third direction D3 intersecting with the first direction D1 and the second direction D2, and a second side 210d which is extended in a fourth direction D4 intersecting with the third direction D3. The first side 210c may be extended by a first length, and the second side 210d may be extended by a second length which is shorter than the first length. In this case, the opening 321e may include a first side 321c substantially parallel with the first side 210c of the housing 210, and a second side (321d) substantially parallel with the second side 210d of the housing 210. The first side 321c of the opening 321e may be extended by a third length, and the second side 321d may be extended by a fourth length which is longer than the third length. For example, the opening 321e may be extended lengthwise in a width direction of the first electrode layer 321. However, embodiments are not limited thereto, and the first side 321c of the opening 321e may be extended by the third length which is longer than the fourth length. For example, the opening 321e may be extended lengthwise in a length direction of the first electrode layer 321.

According to various embodiments, the recess, opening, crack, or gap may be filled with a flexible material. For example, the recess, opening, crack, or gap may be filled with a material such as graphene, Ag nanowire, carbon nanotube (CNT), or polymer.

According to various embodiments of the present disclosure, the haptic actuator 330 may generate a vibration or a haptic effect according to a pressure of an external object. The haptic actuator 330 may vary an intensity of a vibration or a haptic effect according to the intensity of pressure. For example, the haptic actuator 330 may generate a stronger vibration or haptic effect as the pressure of the external object is greater.

According to various embodiments, the battery 350 may be arranged between the pressure sensor 320 and the housing 210. The battery 350 may manage power of the electronic device 100. The battery 350 may include a flexible portion 350a on a position corresponding to the flexible portion 210a of the housing 210 when viewed above the first surface 211 of the housing 210. The flexible portion 350a of the battery 350 may include various structures capable of providing flexibility to the battery 350. For example, the flexible portion 350a of the battery 350 may include a structure in which a plurality of battery cells are connected with one another by a hinge structure although it is not illustrated.

According to various embodiments, the printed circuit board (PCB) 360 may be arranged between the pressure sensor 320 and the housing 210. The PCB 360 may be electrically connected with various elements of the touch screen display 220 and/or the pressure sensor 320. The PCB 360 may include, when viewed above the first surface 211 of the housing 210, a flexible portion 360a on a position corresponding to the flexible portion 210a of the housing 210. The flexible portion 360a of the PCB 360 may include various structures capable of providing flexibility to the PCB 360. For example, the flexible portion 360a of the PCB 360 may include a recess, an opening, a crack, or a gap. Alternatively, the flexible portion 360a of the PCB 360 may be formed with a flexible material.

The internal support structure (for example, a bracket) 340 may support internal elements of the electronic device 100. The internal support structure 340 may fix the battery 350 and the PCB 360. The internal support structure 340 may reinforce overall rigidity of the electronic device 100. For example, the internal support structure 340 may include at least one metal of Al, Mg, or STS. According to various embodiments, the internal support structure 340 may include high stiffness plastic containing a glass fiber. Alternatively, the internal support structure 340 may include both metal and plastic. According to various embodiments, when a metal member and a nonmetal member are used as materials of the internal support structure 340, the internal support structure 340 may be formed by insert injection molding the nonmetal member into the metal member.

According to various embodiments, the internal support structure 340 may be positioned in the second direction D2 of the touch screen display 220. The internal support structure 340 may have a similar shape (curvature) to the shape of the bottom surface of the touch screen display 220, and may support the touch screen display 220. According to various embodiments, an elastic member such as sponge or rubber, an adhesive layer such as a double-sided tape, or a sheet such as a single-sided tape may be additionally arranged between the internal support structure 340 and the touch screen display 220 to protect the touch screen display 220.

Figure 4A:
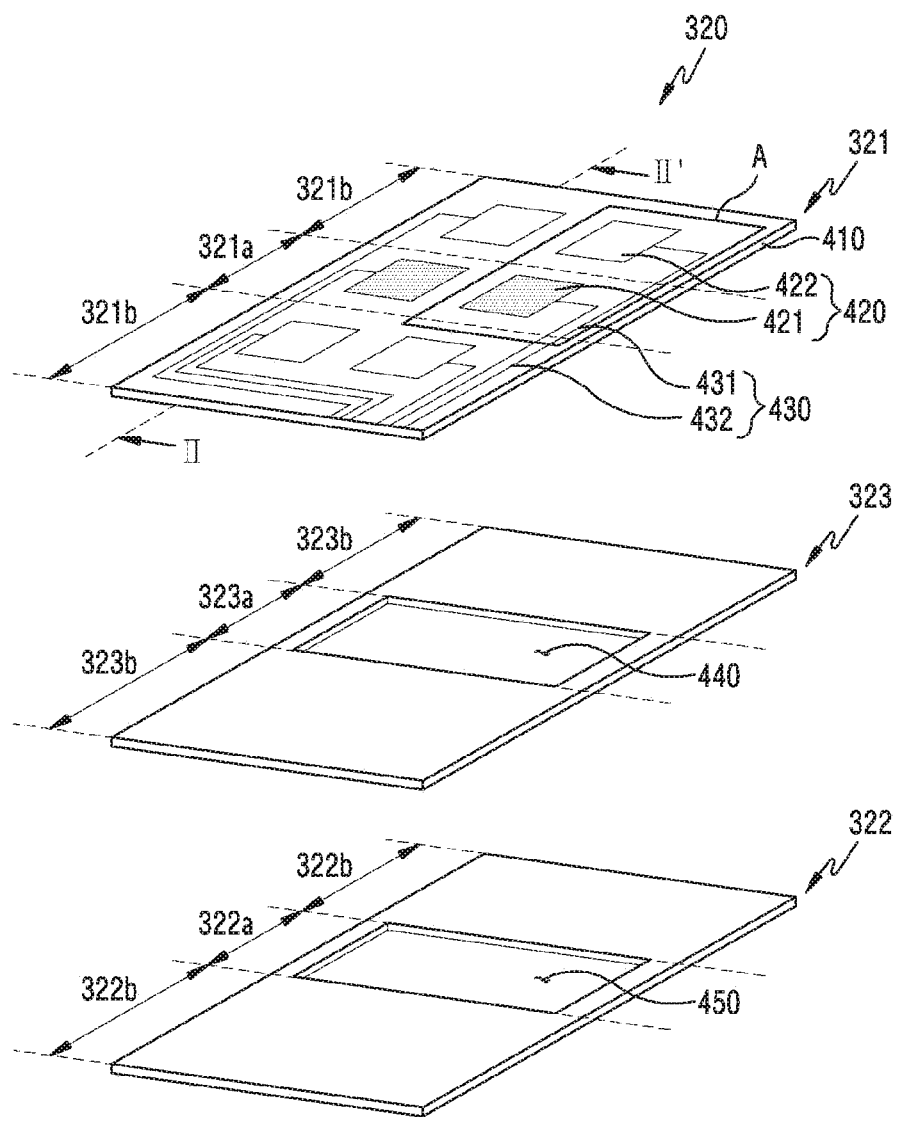
FIG. 4A is an exploded perspective view of a pressure sensor included in an electronic device according to various embodiments.
Figure 4B:
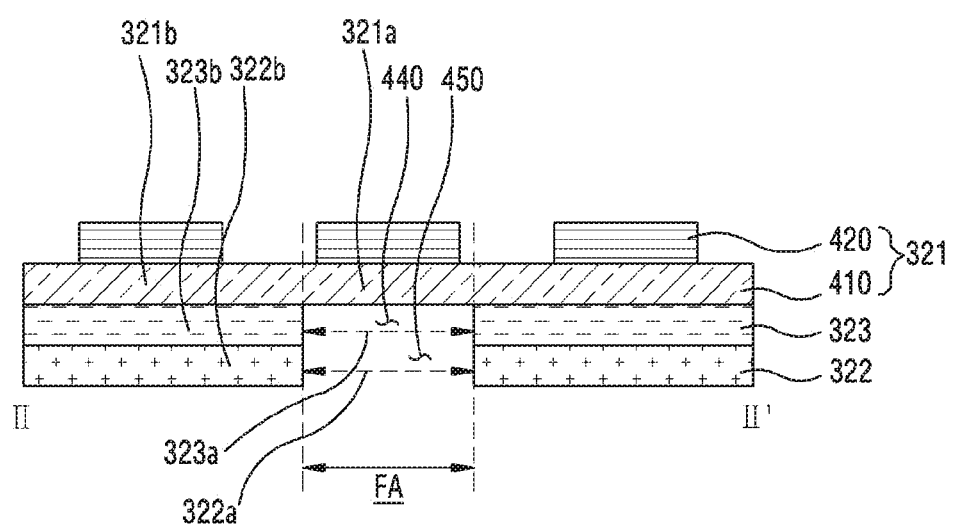
FIG. 4B is a cross-sectional view taken on line II-IF of FIG. 4A.
Figure 4C:
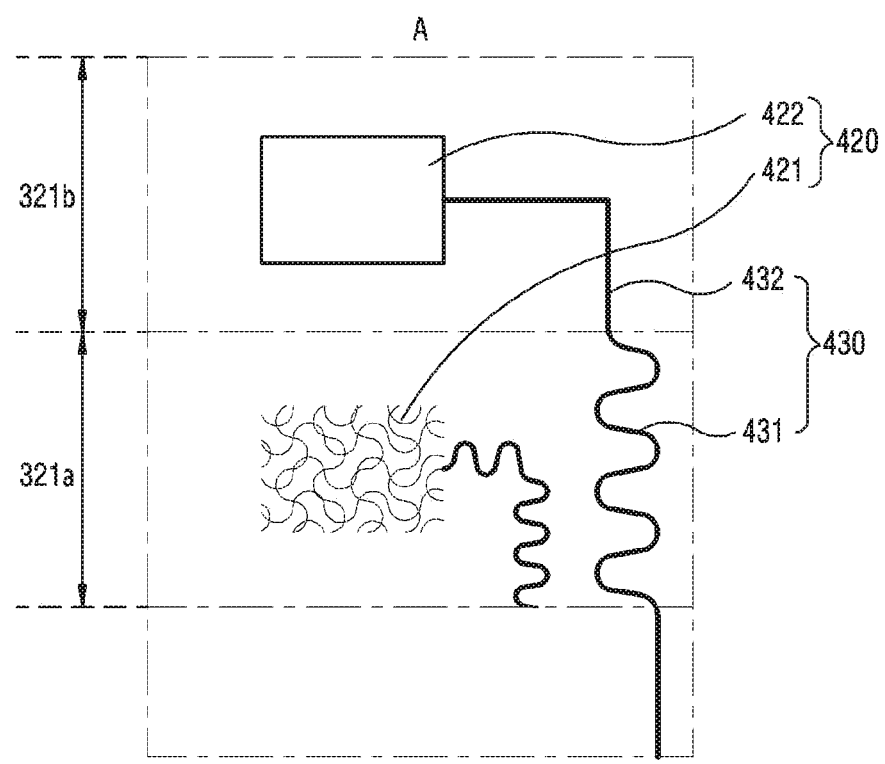
FIGS. 4C, 4D, and 4E are views enlarging an area A of FIG. 4A.
Figure 4D:
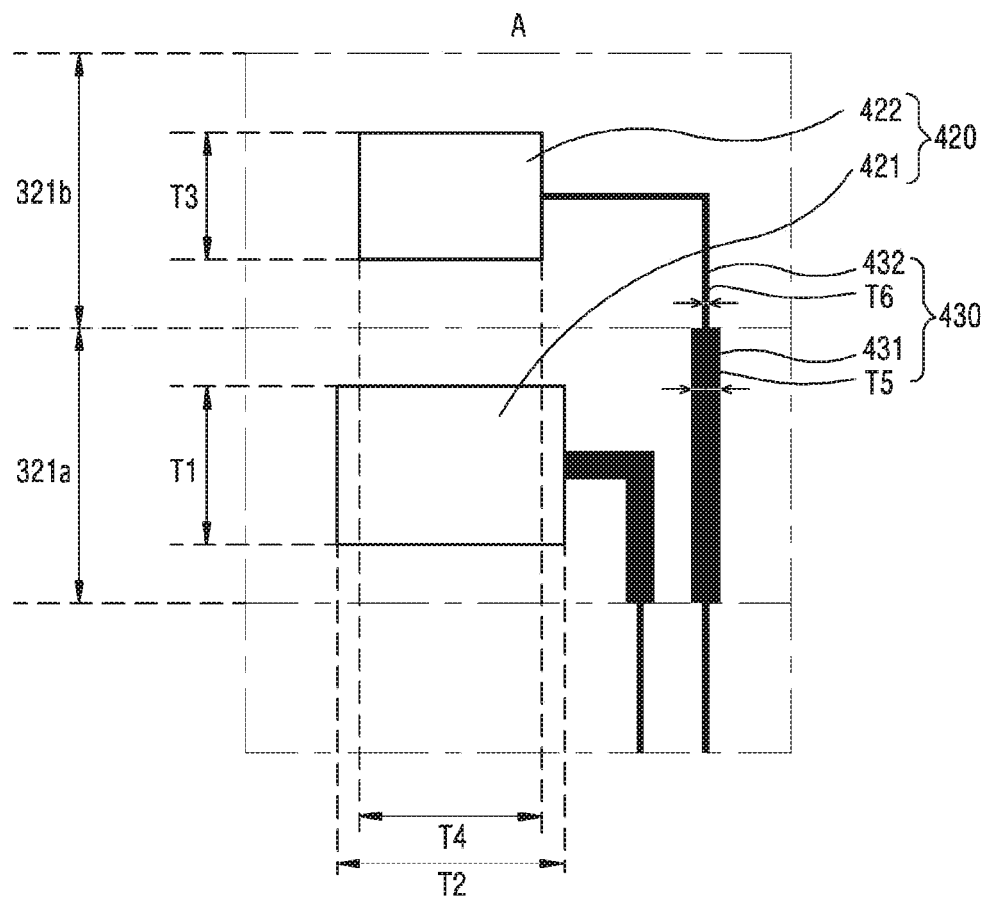
Figure 4E:
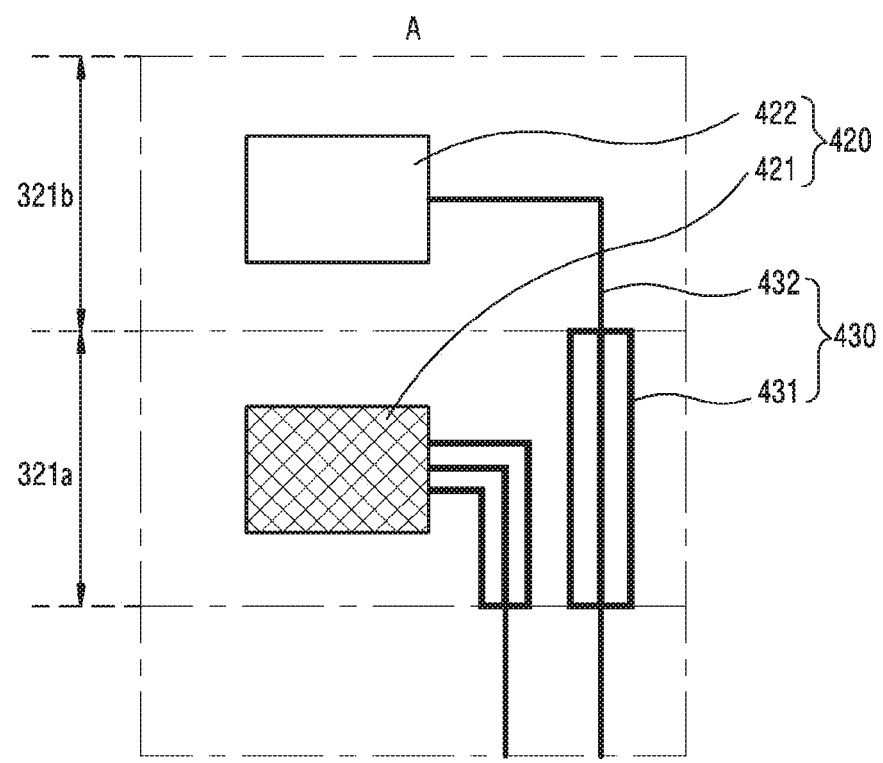

FIG. 4A is an exploded perspective view of a pressure sensor included in an electronic device according to various embodiments. FIG. 4B is a cross-sectional view taken on line II-IF of FIG. 4A. FIGS. 4C, 4D, and 4E are views enlarging the area A of FIG. 4A.

According to various embodiments of the present disclosure, as shown in FIGS. 4A and 4B, the pressure sensor 320 may include a first electrode layer 321, a dielectric layer 323, and a second electrode layer 322.

According to various embodiments, the first electrode layer 321 may include a first portion 321a and a second portion 321b which have flexibility of different degrees. The first electrode layer 321 may include a support member 410, an electrode 420, and a wire 430.

According to various embodiments, the support member 410 may support the electrode 420 and the wire 430. For example, the electrode 420 and the wire 430 may be formed on the support member 410. The support member 410 may include a same or similar material as or to that of the transparent cover 310 described in FIGS. 3A and 3B.

Although it is illustrated in the drawings that the electrode 420 is formed on the support member 410, embodiments are not limited thereto, and the electrode 420 may be directly formed on one surface of the touch screen display 220.

According to various embodiments, the electrode 420 may include electrode patterns which are repeatedly arranged. For example, one electrode pattern may include various shapes such as a rectangle, a diamond, a triangle, a pentagon, a polygon, a circle, a bar, or a mesh.

According to various embodiments of the present disclosure, the electrode 420 of the first electrode layer 321 may have an electrode pattern, and the second electrode layer 322 may be a ground substrate, such that the intensity of pressure can be detected in the self capacitance method. For example, a stimulus signal may be applied to the electrode 420 of the first electrode layer 321, and the second electrode layer 322 may be connected to the ground. However, embodiments are not limited thereto, and the first electrode layer 321 and the second electrode layer 322 may include respective electrode patterns, and may detect the intensity of pressure in the mutual capacitance method. For example, the respective electrode patterns of the first electrode layer 321 and the second electrode layer 322 may have directivities which intersect with each other. In this case, a transmission signal may be applied to the electrode of the first electrode layer 321, and a reception signal corresponding to the transmission signal may be received at the electrode of the second electrode layer 322.

According to various embodiments, the electrode 420 may include various conductive materials. For example, the electrode 420 may include various materials such as indium tin oxide (ITO), indium zinc oxide (IZO), copper oxide, poly(3,4-ethylenedioxythiophene) (PEDOT), metal mesh, carbon nanotube (CNT), Ag nanowire, transparent polymer conductor or graphene.

According to various embodiments, the wire 430 may be electrically connected with the electrode 420. The wire 430 may be formed of a conductive material having an excellent electrical conductivity. The wire 430 may include a same or similar materials as or to that of the electrode 420. The wire 430 may be connected with a circuit board (not shown).

According to various embodiments, the dielectric layer 323 may be arranged between the first electrode layer 321 and the second electrode layer 322. The dielectric layer 323 may include a first portion 323a and a second portion 323b which have flexibility of different degrees. The dielectric layer 323 may include the first portion 323a having flexibility of a first degree, and the second portion 323b having flexibility of a second degree. The flexibility of the first degree may be higher than the flexibility of the second degree. For example, the first portion 323a and the second portion 323b of the dielectric layer 323 may include different materials. The first portion 323a of the dielectric layer 323 may include a material having higher flexibility than that of the second portion 323b. The first portion 323a of the dielectric layer 323 may include gel or fluid having high flexibility.

According to various embodiments, at least part of the first portion 323a may include an opening 440. The opening 440 may be arranged with various shapes and various sizes. Although it is illustrated in the drawing that the opening 440 is formed on at least part of the first portion 323a, embodiments are not limited thereto. For example, at least one of an opening, a recess, a crack, or a gap may be formed on at least part of the first portion 323a. Alternatively, at least one of the opening, recess, crack, or gap may be arranged on the first portion 323a with various shapes and various sizes.

According to various embodiments, the second electrode layer 322 may be a ground (GND) layer. The second electrode layer 322 may include a first portion 322a and a second portion 322b which have flexibility of different degrees. The second electrode layer 322 may include the first portion 322a having flexibility of a first degree, and the second portion 322b having flexibility of a second degree. The flexibility of the first degree may be higher than the flexibility of the second degree. At least part of the first portion 322a may include an opening 450. The opening 450 may be arranged with various shapes and various sizes.

Although it is illustrated in the drawing that the opening 450 is formed on at least part of the first portion 322a, embodiments are not limited thereto. At least one of an opening, recess, crack, or gap may be formed on at least part of the first portion 322a. According to various embodiments, at least one of the opening, recesses, crack, or gap may be arranged on the first portion 322a with various shapes and various sizes.

According to various embodiments, the electrode 420 may include a first electrode 421 arranged on the first portion 321a, and a second electrode 422 arranged on the second portion 321b. The first electrode 421 and the second electrode 422 may include materials which are different from each other. For example, the first electrode 421 may be formed with a material having higher flexibility than that of the second electrode 422. The first electrode 421 may include a material which is resistant to a repeated bending characteristic, such as Ag nanowire, Poly(3,4-ethylenedioxythiophene) (PEDOT), carbon nanotube (CNT), graphene or a combination thereof.

According to various embodiments of the present disclosure, the first electrode 421 and the second electrode 422 may include patterns which are different from each other. For example, the first electrode 421 and the second electrode 422 may include conductive patterns which are different from each other. The first electrode 421 may include a conductive pattern of a first type, and the second electrode 422 may include a conductive pattern of a second type.

According to various embodiments of the present disclosure, the wire 430 may include a first wire 431 arranged on the first portion 321a, and a second wire 432 arranged on the second portion 321b. The first wire(431) and the second sire(432) may include materials which are different from each other. For example, the first wire 431 may be formed with a material having higher flexibility than that of the second wire 432. The first wire 431 may include a material which is resistant to a repeated bending characteristic, such as Ag nanowire, Poly(3,4-ethylenedioxythiophene) (PEDOT), carbon nanotube (CNT), graphene or a combination thereof.

According to various embodiments of the present disclosure, the first wire 431 and the second wire 432 may include patterns which are different from each other. For example, the first wire 431 and the second wire 432 may include conductive patterns which are different from each other. The first wire 431 may include a conductive pattern of a first type, and the second wire 432 may include a conductive pattern of a second type. Hereinafter, detailed description will be provided with reference to FIGS. 4C to 4E.

According to various embodiments of the present disclosure, the first electrode 421 may include the conductive pattern of the first type as shown in FIG. 4C. The conductive pattern of the first type may include a curve. For example, the conductive pattern of the first type may be a meandering pattern. For example, the first electrode 421 arranged on the first portion 321a may include a meandering pattern. Alternatively, the second electrode 422 may include the conductive pattern of the second type. The conductive pattern of the second type may include a rectangle. For example, the second electrode 422 arranged on the second portion 321b may include a rectangular pattern.

According to various embodiments, the first wire 431 arranged on the first portion 321a may include the conductive pattern of the first type. The conductive pattern of the first type may include a curve. For example, the conductive pattern of the first type may be a meandering pattern. For example, the first wire 431 arranged on the first portion 321a may include a meandering pattern. Alternatively, the second wire 432 may include the conductive pattern of the second type. The conductive pattern of the second type may be a straight line. For example, the second wire 432 arranged on the second portion 321b may include a straight line pattern. Although FIG. 4C depicts that the first electrode 421 and the first wire 431 include the same or similar patterns, embodiments are not limited thereto. Accordingly, the first electrode 421 and the first wire 431 may include patterns which are different from each other.

According to various embodiments, as shown in FIG. 4D, the first electrode 421 may include the conductive pattern of the first type. The second electrode 422 may include the conductive pattern of the second type. The conductive pattern of the first type and the conductive pattern of the second type may have sizes or areas which are different from each other. The size or area of the conductive pattern of the first type may be larger than the size or area of the conductive pattern of the second type. Alternatively, at least one width of the conductive pattern of the first type and at least one width of the conductive pattern of the second type may be different from each other. One width of the conductive pattern of the first type may be larger than one width of the conductive pattern of the second type. For example, the first electrode 421 arranged on the first portion 321a may include the conductive pattern of the first type, and the conductive pattern of the first type may include a first width T1 and a second width T2. For example, the first electrode 421 may have the first width T1 and the second width T2. The second electrode 422 arranged on the second portion 321b may include the conductive pattern of the second type, and the conductive pattern of the second type may include a third width T3 which is smaller than the first width T1, and a fourth width T4 which is smaller than the second width T2.

According to various embodiments of the present disclosure, the first wire 431 may include the conductive pattern of the first type. The second wire 432 may include the conductive pattern of the second type. One width of the conductive pattern of the first type and one width of the conductive pattern of the second type may be different from each other. One width of the conductive pattern of the first type may be larger than one width of the conductive pattern of the second type. For example, the first wire 431 arranged on the first portion 321*a* may include the conductive pattern of the first type, and the conductive pattern of the first type may include a fifth width T5. Alternatively, the second wire 432 arranged on the second portion 321*b* may include the conductive pattern of the second type, and the conductive pattern of the second type may include a sixth width T6 which is smaller than the fifth width T5.

According to various embodiments of the present disclosure, as shown in FIG. 4E, the first electrode 421 may include the conductive pattern of the first type. The conductive pattern of the first type may include a plurality of sub patterns. For example, the conductive pattern of the first type may be a mesh pattern. For example, the first electrode 421 arranged on the first portion 321*a* may include a mesh pattern. Alternatively, the second electrode 422 may include the conductive pattern of the second type. The conductive pattern of the second type may include a rectangle. For example, the second electrode 422 arranged on the second portion 321*b* may include a rectangular pattern.

According to various embodiments of the present disclosure, the first wire 431 may include the conductive pattern of the first type. The conductive pattern of the first type may include a plurality of sub patterns. For example, the first wire 431 arranged on the first portion 321*a* may include a plurality of sub patterns. The second wire 432 may include the conductive pattern of the second type. The conductive pattern of the second type may be a single line. For example, the second wire 432 arranged on the second portion 321*b* may be a single line.

Figure 5A:
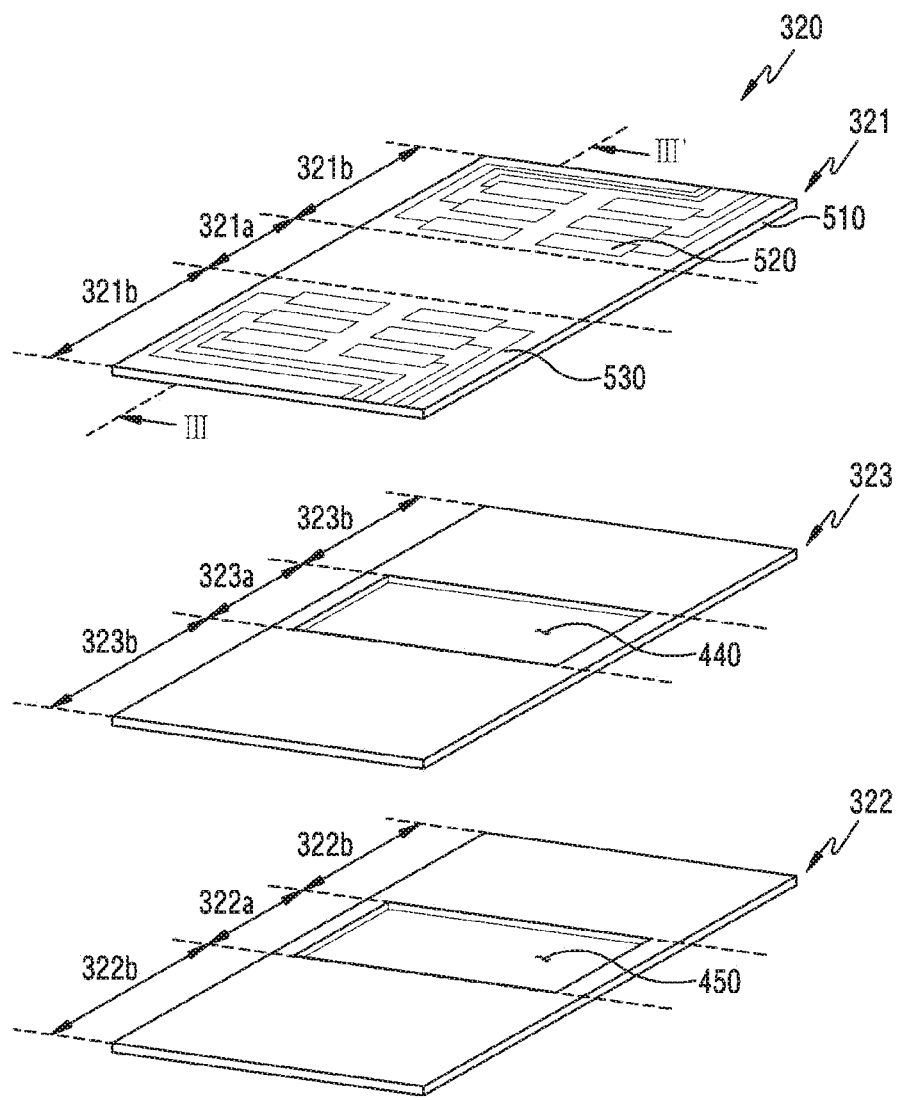
FIG. 5A is an exploded perspective view of a pressure sensor included in an electronic device according to various embodiment.
Figure 5B:
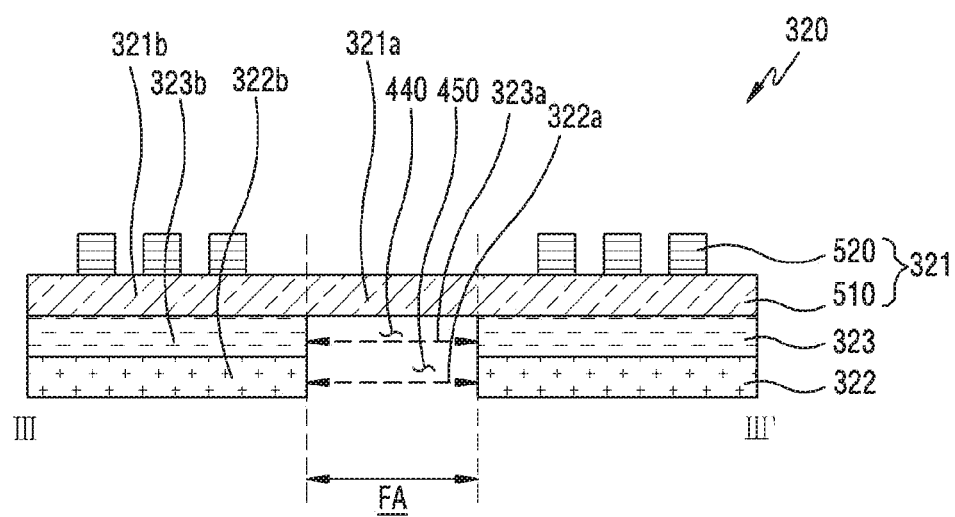
FIGS. 5B and 5C are cross-sectional views taken on line of FIG. 5A.
Figure 5C:
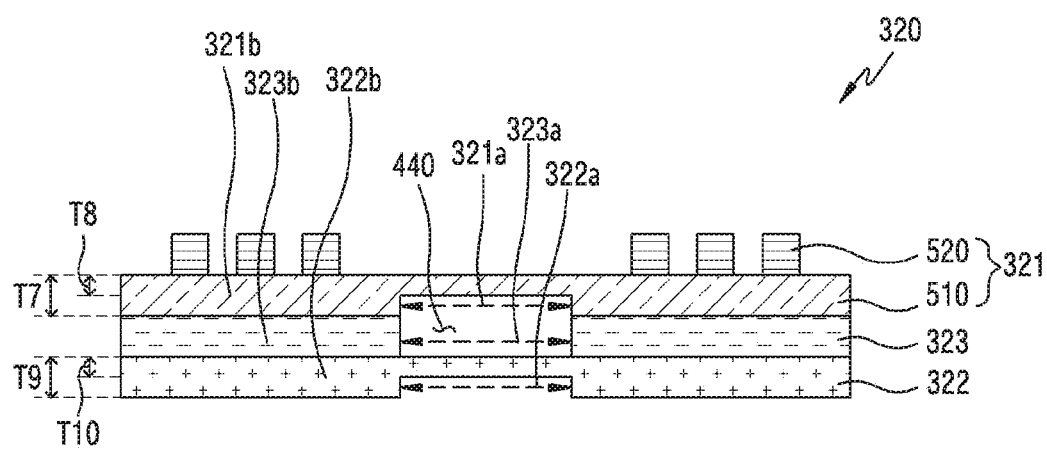

FIG. 5A is an exploded perspective view of a pressure sensor included in an electronic device according to various embodiments. FIGS. 5B and 5C are cross-sectional views taken on line of FIG. 5A. Hereinafter, the same or similar portions as or to those described in FIG. 4 will not be described in detail.

As shown in FIGS. 5A and 5B, according to various embodiments of the present disclosure, a first portion 321*a* of a first electrode layer 321 may not include an electrode 520 and a wire 530. For example, the electrode 520 and the wire 530 may not be formed on a support member 510 in the first portion 321*a*. Accordingly, the electrode 520 and the wire 530 may be formed only on a second portion 321*b* of the first electrode layer 321.

According to various embodiments of the present disclosure, at least part of a first portion 323*a* of a dielectric layer 323 may include an opening 440. Alternatively, at least part of a first portion 322*a* of a second electrode layer 322 may include an opening 450.

As shown in FIG. 5C, according to various embodiments of the present disclosure, the support member 510 may include different thicknesses. For example, a thickness T8 of the support member 510 in the first portion 321*a* and a thickness T7 of the support member 510 in the second portion 321*b* may be different from each other. The thickness T8 of the support member 510 in the first portion 321*a* may be smaller than the thickness T7 in the second portion 321*b*. Alternatively, a thickness T10 of the second electrode layer 322 in the first portion 322*a* and a thickness T9 of the second electrode layer 322 in the second portion 322*b* may be different from each other. For example, the thickness T10 of the second electrode layer 322 in the first portion 322*a* may be smaller than the thickness T9 in the second portion 322*b*.

Figure 6A:
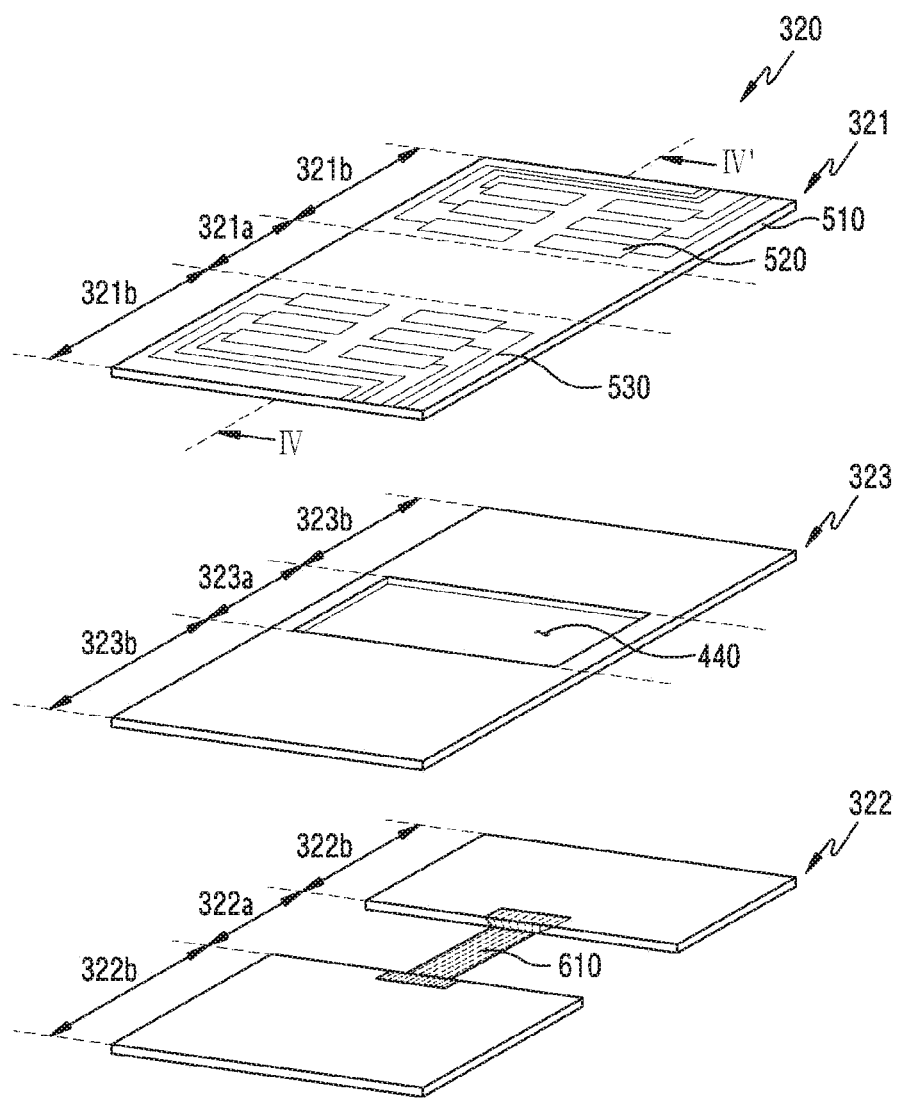
FIG. 6A is an exploded perspective view of a pressure sensor included in an electronic device according to various embodiments.
Figure 6B:
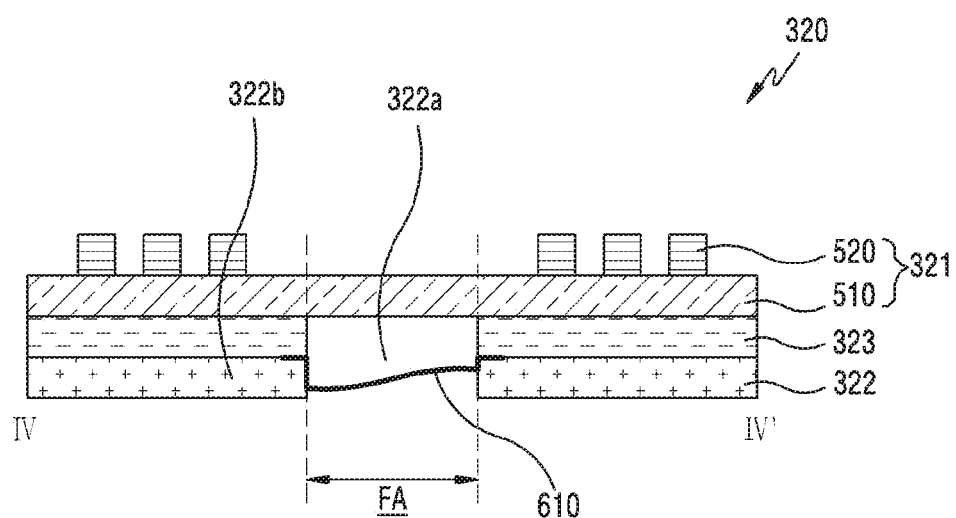
FIG. 6B is a cross-sectional view taken on line IV-IV' of FIG. 6A.

FIG. 6A is an exploded perspective view of a pressure sensor included in an electronic device according to various embodiments. FIG. 6B is a cross-sectional view taken on line IV-IV' of FIG. 6A. Hereinafter, the same or similar portions as or to those described in FIG. 5 will not be described in detail.

As shown in FIGS. 6A and 6B, according to various embodiments of the present disclosure, a circuit board (or a flexible printed circuit board (FPCB)) 610 may be arranged on a first portion 322*a* of a second electrode layer 322. The first portion 322*a* of the second electrode layer 322 may be a disconnected portion where the second electrode layer 322 is not formed, and the circuit board 610 may be arranged on such a disconnected portion. Second portions 322*b* of the second electrode layer 322 may be connected with each other through the circuit board 610.

Figure 7A:
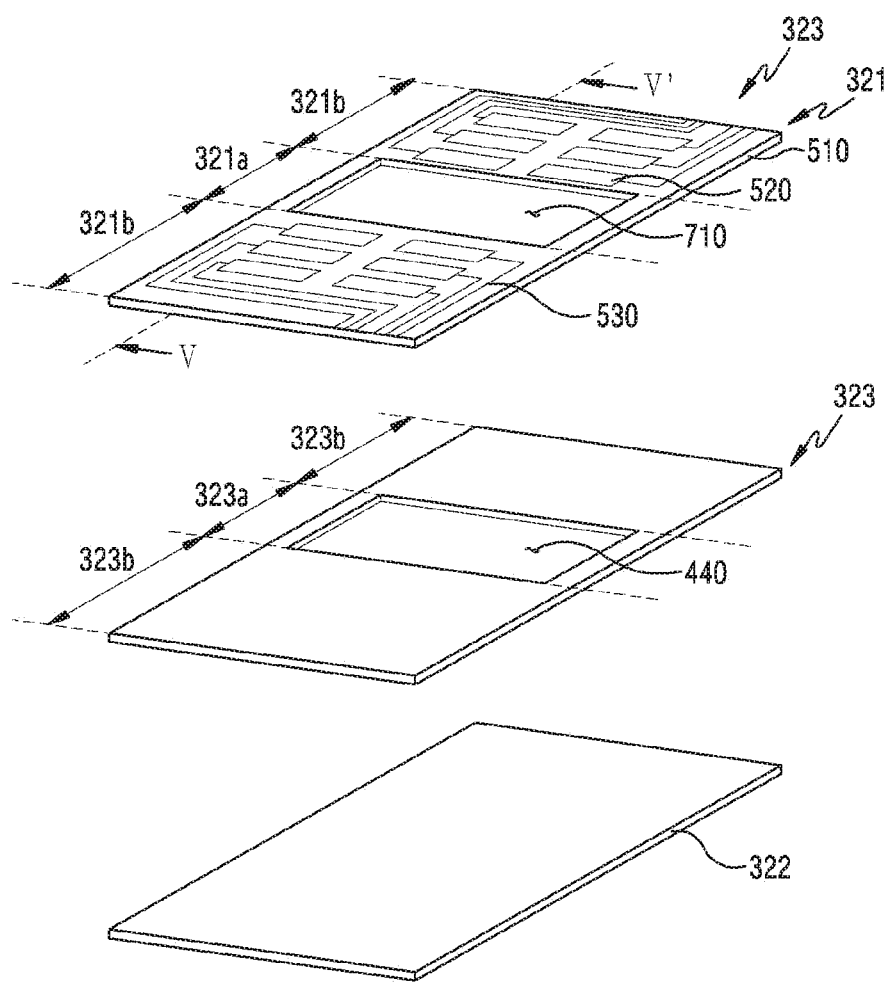
FIG. 7A is an exploded perspective view of a pressure sensor included in an electronic device according to various embodiments.
Figure 7B:
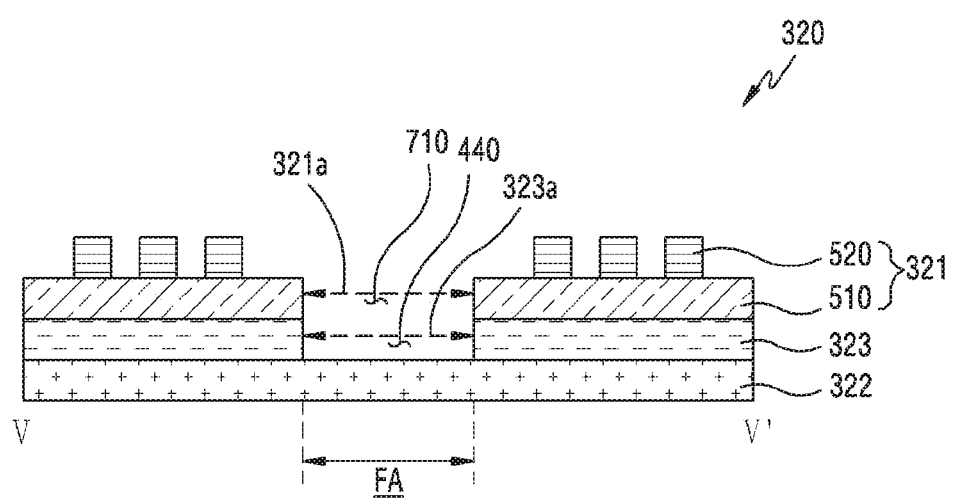
FIG. 7B is a cross-sectional view taken on line V-V' of FIG. 7A.

FIG. 7A is an exploded perspective view of a pressure sensor included in an electronic device according to various embodiments. FIG. 7B is a cross-sectional view taken on line V-V' of FIG. 7A.

As shown in FIGS. 7A and 7B, according to various embodiments of the present disclosure, a support member 510 may include an opening 710 on a first portion 321*a* of a first electrode layer 321. Alternatively, at least one of a second electrode layer 322 and a dielectric layer 323 may include an opening. For example, a first portion 323*a* of the dielectric layer 323 may include an opening 440. In this case, a first portion 322*a* of the second electrode 322 may not include an opening. However, embodiments are not limited thereto, and the first portion 322*a* of the second electrode layer 322 may include an opening.

Figure 8A:
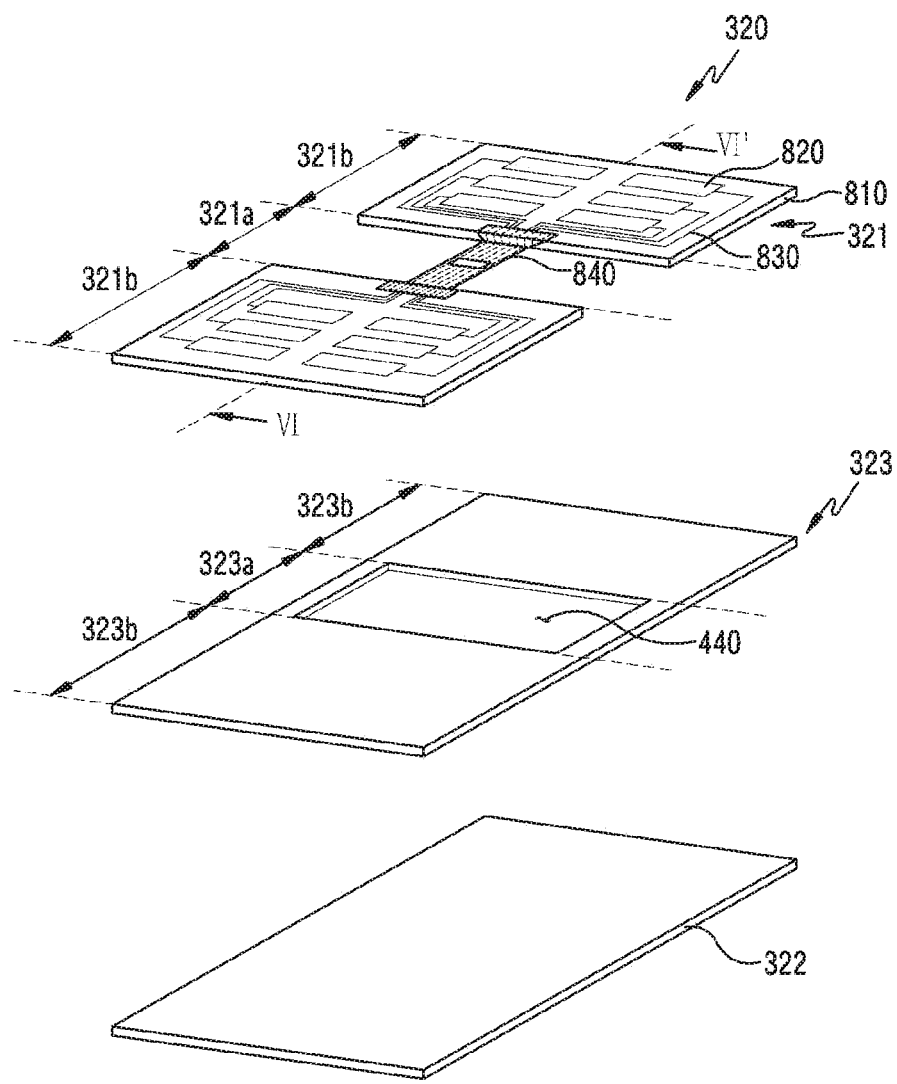
FIG. 8A is an exploded perspective view of a pressure sensor included in an electronic device according to various embodiments.
Figure 8B:
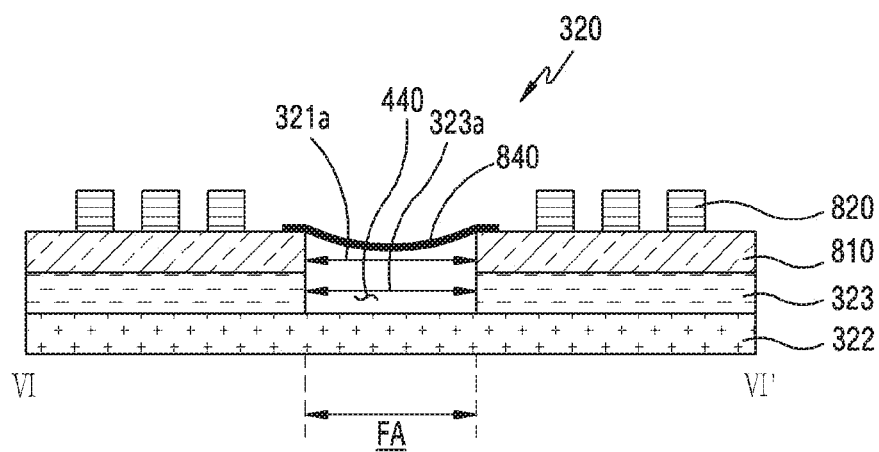
FIG. 8B is a cross-sectional view taken on line VI-VI' of FIG. 8A.

FIG. 8A is an exploded perspective view of a pressure sensor included in an electronic device according to various embodiments. FIG. 8B is a cross-sectional view taken on line VI-VI' of FIG. 8A.

As shown in FIGS. 8A and 8B, according to various embodiments of the present disclosure, a circuit board 840 may be arranged on a first portion 321*a* of a first electrode layer 321. The first portion 321*a* of the first electrode layer 321 may be a disconnected portion where an electrode 820 and a wire 840 are not formed, and the circuit board 840 may be arranged on such a disconnected portion. The first electrode layers 321 arranged on second portions 321*b* may be connected with each other through the circuit board 840. The wire 830 may be electrically connected with the circuit board 840. The circuit board 840 may be spaced apart from a touch screen display (not shown) arranged thereon. The circuit board 840 may not be attached to the touch screen display.

Figure 9:
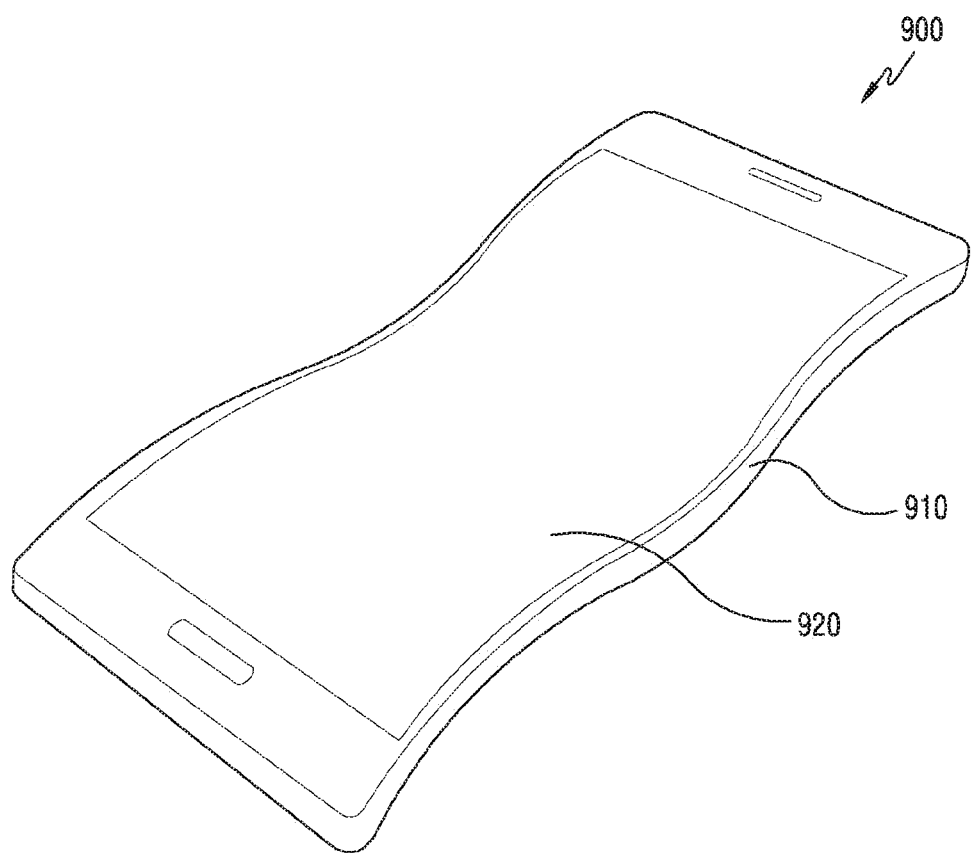
FIG. 9 is a perspective view of an electronic device according to various embodiments of the present disclosure.

FIG. 9 is a perspective view of an electronic device according to various embodiments of the present disclosure.

As shown in FIG. 9, according to various embodiments of the present disclosure, the electronic device 900 may be a flexible electronic device. The electronic device 900 may be implemented to be entirely flexible. The electronic device 900 may include a housing 910 and a touch screen display 920, and the housing 910 and the touch screen display 920 may be implemented to be entirely flexible.

Figure 10A:
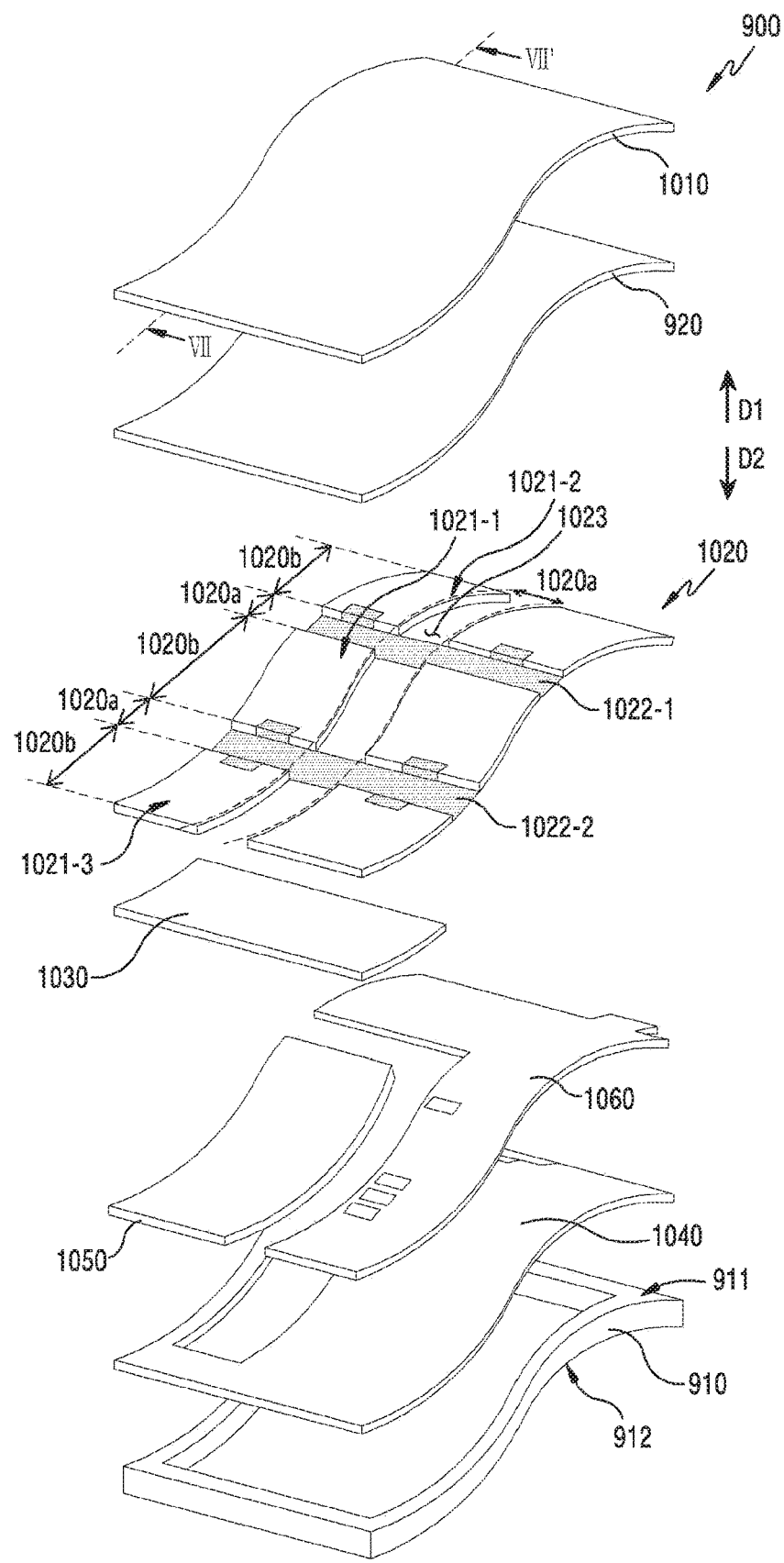
FIG. 10A is an exploded perspective view of an electronic device according to various embodiments.
Figure 10B:
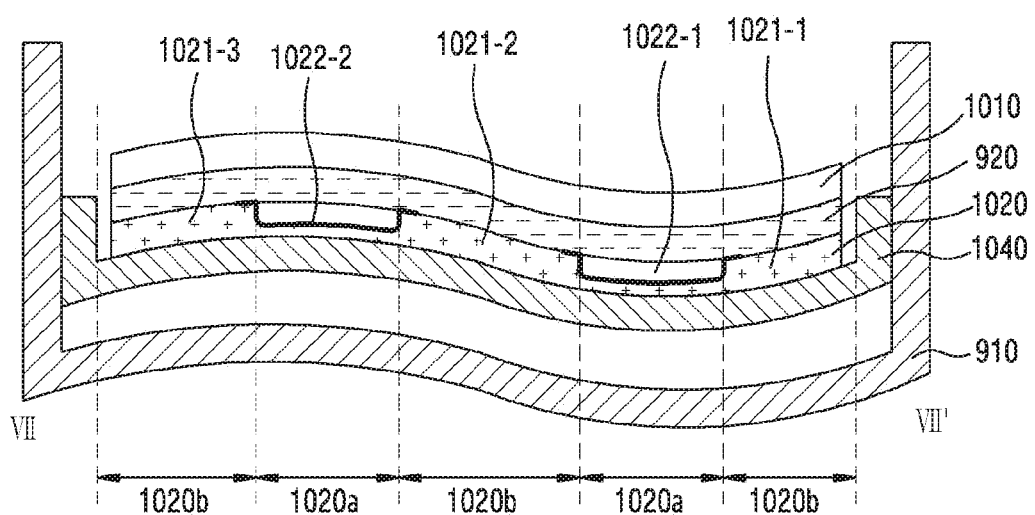
FIG. 10B is a cross-sectional view taken on line VII-VII' of FIG. 10A.

FIG. 10A is an exploded perspective view of an electronic device according to various embodiments. FIG. 10B is a cross-sectional view taken on line VII-VII' of FIG. 10A.

According to various embodiments of the present disclosure, as shown in FIGS. 10A and 10B, the electronic device 900 may include a housing 910, a transparent cover 1010, a touch screen display 920, a pressure sensor 1020, a haptic actuator 1030, a battery 1050, a printed circuit board 1060, and/or an internal support structure 1040. The same or similar portions as or to those described in FIGS. 3A and 3B will not be described in detail.

According to various embodiments, the pressure sensor 1020 may include a first portion 1020a and a second portion 1020b which have flexibility of different degrees. The pressure sensor 1020 may include the first portion 1020a having flexibility of a first degree, and the second portion 1020b having flexibility of a second degree which is different from the flexibility of the first degree. The flexibility of the first degree may be higher than the flexibility of the second degree. The pressure sensor 1020 may include at least one first portion 1020a. The first portion 1020a may include an opening 1023. The pressure sensor 1020 may include a plurality of openings 1023 arranged on the first portions 1020a. The first portion 1020a has the opening 1023, such that the first portion 1020a may have higher flexibility than that of the second portion 1020b. Although it is illustrated in the drawing that the opening 1023 is arranged on the first portion 1020a, embodiments are not limited thereto, and a plurality of recesses, cracks, or gaps may be arranged on the first portions 1020a.

According to various embodiments, the pressure sensor 1020 may include a plurality of circuit boards 1022-1, 1022-2. The circuit boards 1022-1, 1022-2 may be arranged on at least part of the first portions 1020a. The circuit boards 1022-1, 1022-2 may be arranged to be spaced apart from the touch screen display 920. The circuit boards 1022-1, 1022-2 may not be attached to the touch screen display 920.

According to various embodiments, the pressure sensor 1020 may include a plurality of sub pressure sensors 1021-1, 1021-2, 1021-3. The sub pressure sensors 1021-1, 1021-2, 1021-3 may be arranged on the second portions 1020b. The sub pressure sensors 1021-1, 1021-2, 1021-3 may not overlap at least one flexible portion of the housing 901 at least in part when viewed above a first surface 911 of the housing 910. The sub pressure sensors 1021-1, 1021-2, 1021-3 may be arranged to be separated from one another. The circuit boards 1022-1, 1022-1 may be arranged between the sub pressure sensors 1021-1, 1021-2, 1021-3. The sub pressure sensors 1021-1, 1021-2, 1021-3 may be electrically connected with one another through the circuit boards 1022-1, 1022-2.

Figure 11A:
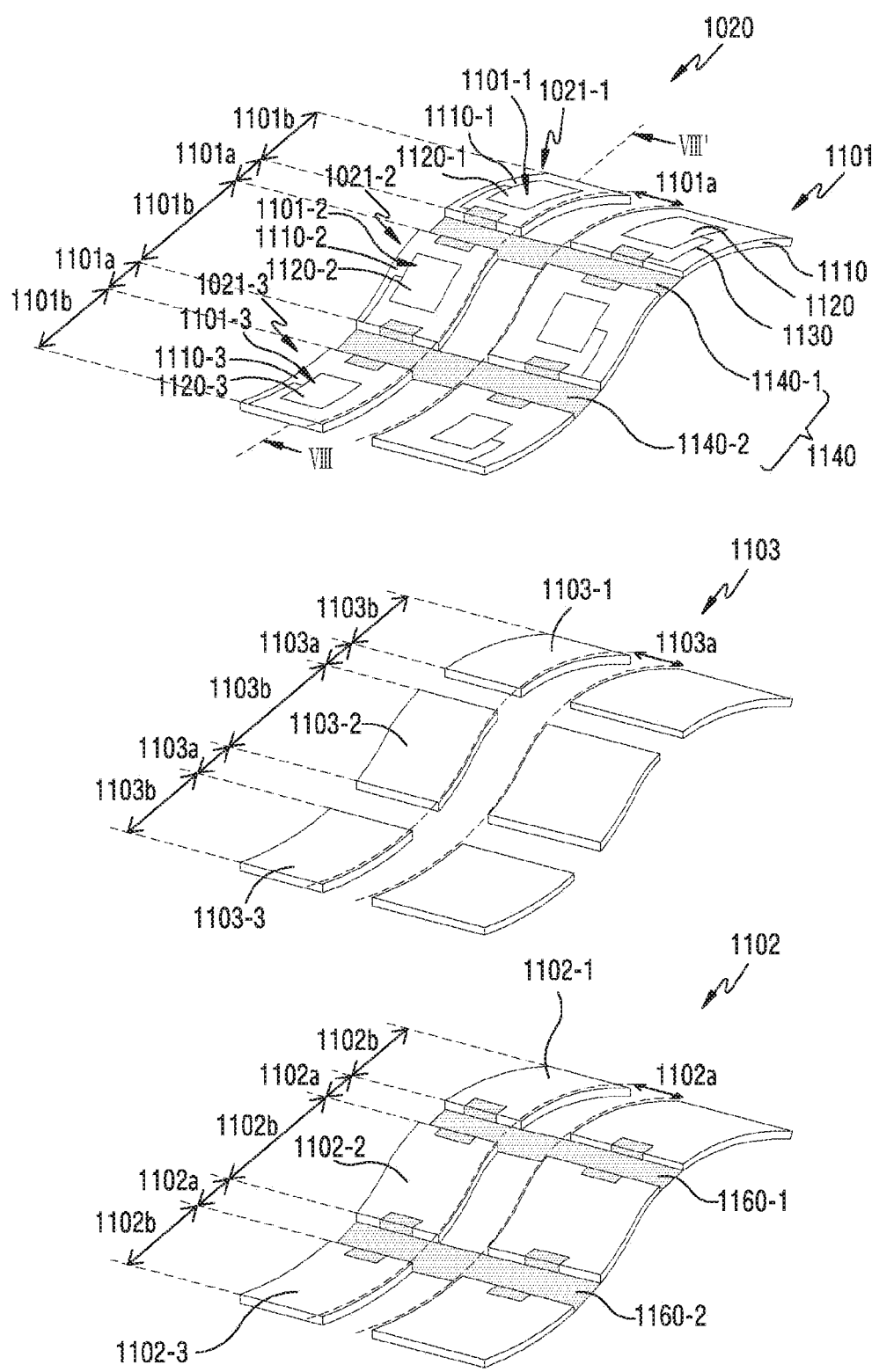
FIG. 11A is an exploded perspective view of a pressure sensor included in an electronic device according to various embodiments.
Figure 11B:
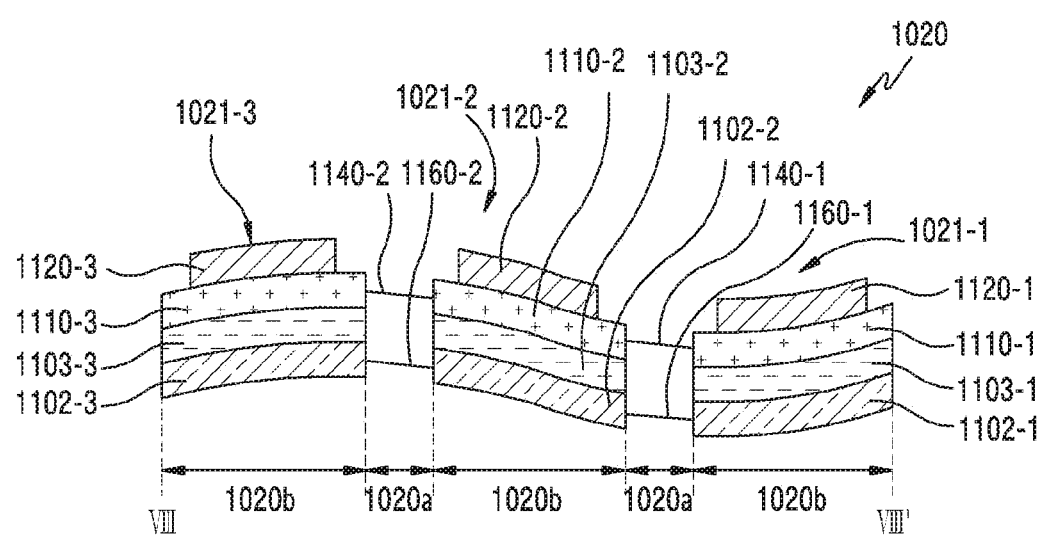
FIG. 11B is a cross-sectional view taken on line VIII-VIII' of FIG. 11A.

FIG. 11A is an exploded perspective view of a pressure sensor included in an electronic device according to various embodiments. FIG. 11B is a cross-sectional view taken on line VIII-VIII' of FIG. 11A.

According to various embodiments of the present disclosure, as shown in FIGS. 11A and 11B, a pressure sensor 1020 may include a first electrode layer 1101, a dielectric layer 1103, and a second electrode layer 1102. The pressure sensor 1020 may include sub pressure sensors 1021-1, 1021-2, 1021-3 which are arranged to be separated from one another.

According to various embodiments, the first electrode layer 1101 may include a first portion 1101a and a second portion 1101b which have flexibility of different degrees. The first electrode layer 1101 may include the first portion 1101a having flexibility of a first degree, and the second portion 1101b having flexibility of a second degree which is different from the flexibility of the first degree. The flexibility of the first degree may be higher than the flexibility of the second degree. The first electrode layer 1101 may include a plurality of first portions 1101a. The first electrode layer 1101 may include a support member 1110, an electrode 1120, a wire 1130, and a circuit board 1140.

According to various embodiments, the first electrode layer 1101 may include a plurality of sub first electrode layers 1101-1, 1101-2, 1101-3. The sub first electrode layers 1101-1, 1101-2, 1101-3 may be arranged on the second portions 1101b. The sub first electrode layers 1101-1, 1101-2, 1101-3 may be arranged to be separated from one another. Circuit boards 1140-1, 1140-2 may be arranged between the sub first electrode layers 1101-1, 1101-2, 1101-3. The sub first electrode layers 1101-1, 1101-2, 1101-3 may be electrically connected with one another through the circuit boards 1140-1, 1140-2.

According to various embodiments, the support member 1110 may include a plurality of sub support members 1110-1, 1110-2, 1110-3. The plurality of sub support members 1110-1, 1110-2, 1110-3 may be arranged on the second portions 1101b. The sub support members 1110-1, 1110-2, 1110-3 may be arranged to be separated from one another. The circuit boards 1140-1, 1140-2 may be arranged between the sub support members 1110-1, 1110-2, 1110-3.

According to various embodiments, the electrode 1120 may include a plurality of sub electrodes 1120-1, 1120-2, 1120-3. The plurality of sub electrodes 1120-1, 1120-2, 1120-3 may be arranged on the second portions 1101b. The plurality of sub electrodes 1120-1, 1120-2, 1120-3 may be arranged on the plurality of sub support members 1110-1, 1110-2, 1110-3, respectively.

According to various embodiments, the wire 1130 may be electrically connected with the electrode 1120. The wire 1130 may be electrically connected with the plurality of sub electrodes 1120-1, 1120-2, 1120-3. The wire 1130 may be electrically connected with the circuit boards 1140-1, 1140-2.

According to various embodiments, the first electrode layer 1101 may include the plurality of circuit boards 1140-1, 1140-2. The plurality of circuit boards 1140-1, 1140-2 may be arranged on at least part of the first portions 1101a. The circuit boards 1140-1, 1140-2 may be arranged to be spaced apart from the touch screen display (not shown) arranged thereon. The circuit boards 1140-1, 1140-2 may not be attached to the touch screen display.

According to various embodiments, the dielectric layer 1103 may be arranged between the first electrode layer 1101 and the second electrode layer 1102. The dielectric layer 1103 may include a first portion 1103a and a second portion 1103b which have flexibility of different degrees. The dielectric layer 1103 may include the first portion 1103a having flexibility of a first degree, and the second portion 1103b having flexibility of a second degree. The flexibility of the first degree may be higher than the flexibility of the second degree. A plurality of first portions 1103a may be arranged on the dielectric layer 1103.

According to various embodiments, the dielectric layer 1103 may include a plurality of sub dielectric layers 1103-1, 1103-2, 1103-3. The sub dielectric layers 1103-1, 1103-2, 1103-3 may be arranged on the second portions 1103b. The sub dielectric layers 1103-1, 1103-2, 1103-3 may be arranged to be separated from one another.

According to various embodiments, the second electrode layer 1102 may be a ground (GND) layer. The second electrode layer 1102 may include a first portion 1102a and a second portion 1102b which have flexibility of different degrees. The second electrode layer 1102 may include the first portion 1102a having flexibility of a first degree, and the second portion 1102b having flexibility of a second degree. The flexibility of the first degree may be higher than the flexibility of the second degree. A plurality of second portions 1102b may be arranged on the second electrode layer 1102.

According to various embodiments, the second electrode layer 1102 may include a plurality of sub second electrode layers 1102-1, 1102-2, 1102-3. The sub second electrode layers 1102-1, 1102-2, 1102-3 may be arranged on the second portions 1102b. The sub second electrode layers 1102-1, 1102-2, 1102-3 may be arranged to be separated from one another.

According to various embodiments, the second electrode layer 1102 may include a plurality of circuit boards 1160-1, 1160-2. The plurality of circuit boards 1160-1, 1160-2 may be arranged on at least part of the first portions 1102a. The sub second electrode layers 1102-1, 1102-2, 1102-3 may be electrically connected with one another through the circuit boards 1160-1, 1160-2.

Figure 12:
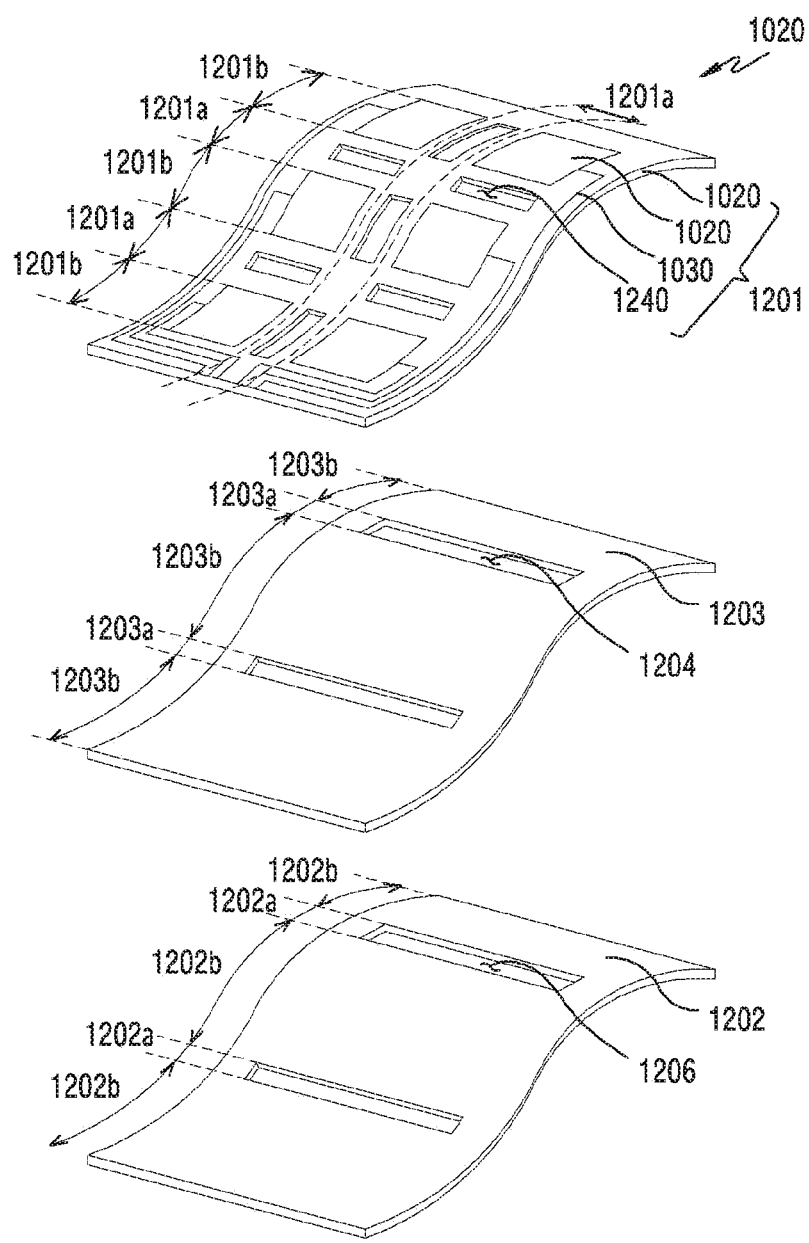
FIG. 12 is an exploded perspective view of a pressure sensor included in an electronic device according to various embodiments.

FIG. 12 is an exploded perspective view of a pressure sensor included in an electronic device according to various embodiments.

According to various embodiments, as shown in FIG. 12, the pressure sensor 1020 may include a first electrode layer 1201, a dielectric layer 1203, and a second electrode layer 1202.

According to various embodiments, the first electrode layer 1021 may include a first portion 1201a having flexibility of a first degree, and a second portion 1201b having flexibility of a second degree which is different from the flexibility of the first degree. The flexibility of the first degree may be higher than the flexibility of the second degree. The first electrode layer 1201 may include a plurality of first portions 1201a. An opening 1240 may be formed on at least part of the first portions 1201a. According to various embodiments of the present disclosure, the opening 1240 may be arranged on only a part of the first portion 1201a.

According to various embodiments, the dielectric layer 1203 may be arranged between the first electrode layer 1201 and the second electrode layer 1202. The dielectric layer 1203 may include a first portion 1203a and a second portion 1203b which have flexibility of different degrees. The dielectric layer 1203 may include the first portion 1203a having flexibility of a first degree, and the second portion 1203b having flexibility of a second degree. The flexibility of the first degree may be higher than the flexibility of the second degree. A plurality of first portions 1203a may be arranged on the dielectric layer 1203. At least part of the first portion 1203a may include the opening 1204. According to various embodiments of the present disclosure, the opening 1204 may be arranged on only a part of the first portion 1203a.

According to various embodiments, the second electrode layer 1202 may be a ground (GND) layer. The second electrode layer 1202 may include a first portion 1202a and a second portion 1202b which have flexibility of different degrees. The second electrode layer 1202 may include the first portion 1202a having flexibility of a first degree, and the second portion 1202b having flexibility of a second degree. The flexibility of the first degree may be higher than the flexibility of the second degree. At least part of the first portion (323a) may include an opening 1206. Although it is illustrated in the drawing that the opening is formed on at least part of the first portion 1202a, the opening 1206 may be arranged on only a part of the first portion 1202a according to various embodiments of the present disclosure.

According to various embodiments of the present disclosure, an electronic device may include: a housing including, in an unfolded state, a first surface facing a first direction and a second surface facing a second direction opposite to the first direction, the housing including at least one flexible portion; a touch screen display arranged between the first surface and the second surface of the housing, and exposed through the first surface of the housing, and including at least one flexible portion on a position corresponding to the flexible portion of the housing when viewed from above the first surface; and a pressure sensor arranged between the touch screen display and the second surface of the housing, and including at least one flexible portion on a position corresponding to the flexible portion of the housing when viewed above the first surface. The pressure sensor may include: a first electrode layer formed in substantially parallel with the touch screen display; a second electrode layer spaced apart from the first electrode layer in the second direction, and formed in substantially parallel with the first electrode layer; and a dielectric layer arranged between the first electrode layer and the second electrode layer.

According to various embodiments of the present disclosure, at least one of the first electrode layer, the second electrode layer, or the dielectric layer may include, when viewed above the first surface, a first portion having flexibility of a first degree, and a second portion having flexibility of a second degree which is lower than the first degree.

According to various embodiments of the present disclosure, the first portion of at least one of the first electrode layer, the second electrode layer, or the dielectric layer may include at least one of a recess, an opening, or a gap.

According to various embodiments of the present disclosure, the housing may include a first side which is extended by a first length in a third direction which intersects with the first and second directions, and a second side which is extended by a second length shorter than the first length in a fourth direction which intersects with the third direction, and at least one of the recess, the opening, and the gap may include a first side which is substantially parallel to the first side of the housing, and is extended by a third length, and a second side which is substantially parallel to the second side of the housing, and is extended by a fourth length. The third length may be shorter than the fourth length.

According to various embodiments of the present disclosure, the housing may include a first side which is extended by a first length in a third direction which intersects with the first and second directions, and a second side which is extended by a second length shorter than the first length in a fourth direction which intersects with the third direction, and at least one of the recess, the opening, and the gap may include a first side which is substantially parallel to the first side of the housing, and is extended by a third length, and a second side which is substantially parallel to the second side of the housing, and is extended by a fourth length. The third length may be longer than the fourth length.

According to various embodiments of the present disclosure, at least one of the recess, the opening, and the gap may be filled with a flexible material.

According to various embodiments of the present disclosure, the first portion of at least one of the first electrode layer or the second electrode layer may include a conductive pattern of a first type, and the second portion of the at least one of the first electrode layer or the second electrode layer may include a conductive pattern of a second type.

According to various embodiments of the present disclosure, the conductive pattern of the first type may include a meandering pattern, a mesh pattern, or a pattern in which one wire is divided into a plurality of wires.

According to various embodiments of the present disclosure, one width of the conductive pattern of the first type may be larger than one width of the conductive pattern of the second type.

According to various embodiments of the present disclosure, the first portion of the at least one of the first electrode layer, the second electrode layer, or the dielectric layer may include a material different from that of the second portion at least in part.

According to various embodiments of the present disclosure, a thickness of the first portion of at least one of the first electrode layer, the second electrode layer, or the dielectric layer in the second direction may be smaller than a thickness of the second portion.

According to various embodiments of the present disclosure, the pressure sensor may include at least one support member contacting the first electrode layer or the second electrode layer, and the at least one support member may include a first portion having the flexibility of the first degree, and a second portion having the flexibility of the second degree.

According to various embodiments of the present disclosure, a thickness of the first portion of the first support member may be smaller than a thickness of the second portion.

According to various embodiments of the present disclosure, a flexible printed circuit board (FPCB) may be arranged on the first portion of at least one of the first electrode layer, the second electrode layer, or the dielectric layer.

According to various embodiments of the present disclosure, the pressure sensor may include a plurality of sub pressure sensors, and the plurality of sub pressure sensors may be arranged to be spaced apart from one another.

According to various embodiments of the present disclosure, a flexible printed circuit board (FPCB) may be arranged at a spaced apart portion of the plurality of sub pressure sensors.

According to various embodiments of the present disclosure, when viewed above the first surface of the housing, the plurality of sub pressure sensors may not overlap the at least one flexible portion of the housing at least in part.

According to various embodiments of the present disclosure, the electronic device may further include at least one hinge structure arranged between the first surface and the second surface of the housing, and configured to provide flexibility to the flexible portion of the housing, and the hinge structure may be foldable about an axis of the flexible portion of the housing in the first direction and/or the second direction.

According to various embodiments of the present disclosure, the electronic device may further include at least one battery arranged between at least part of the pressure sensor and at least part of the second surface of the housing, and, when viewed above the first surface of the housing, the at least one battery may include at least one flexible portion on a position corresponding to the flexible portion of the housing.

According to various embodiments of the present disclosure, the electronic device may further include at least one PCB arranged between at least part of the pressure sensor and at least part of the second surface of the housing, and, when viewed above the first surface of the housing, the at least one PCB may include at least one flexible portion on a position corresponding to the flexible portion of the housing.

Embodiments of the present disclosure disclosed in the specification and the drawings are suggested for easy explanation and understanding of the technical features of the present disclosure, and are not intended to limit the scope of the present disclosure. That is, it is obvious to a person skilled in the art that other variations can be embodied based on the technical idea of the present disclosure.

What is claimed is:

1. An electronic device comprising:
   a housing comprising, in an unfolded state, a first surface facing a first direction and a second surface facing a second direction opposite to the first direction, the housing comprising at least one flexible portion;
   a touch screen display arranged between the first surface and the second surface of the housing, and exposed through the first surface of the housing, and comprising at least one flexible portion on a position corresponding to the flexible portion of the housing when viewed from above the first surface; and
   a pressure sensor arranged between the touch screen display and the second surface of the housing, and comprising at least one flexible portion on a position corresponding to the flexible portion of the housing when viewed above the first surface,
   wherein the pressure sensor comprises:
      a first electrode layer formed in substantially parallel with the touch screen display;
      a second electrode layer spaced apart from the first electrode layer in the second direction, and formed in substantially parallel with the first electrode layer; and
      a dielectric layer arranged between the first electrode layer and the second electrode layer,
   wherein the at least one flexible portion comprises at least one of a recess, an opening, a crack, or a gap filled with a flexible material,
   wherein the pressure sensor comprises a plurality of sub pressure sensors, and the plurality of sub pressure sensors are arranged to be spaced apart from one another, and
   wherein a flexible printed circuit board (FPCB) is arranged at a spaced apart portion of the plurality of sub pressure sensors.

2. The electronic device of claim 1, wherein at least one of the first electrode layer, the second electrode layer, or the dielectric layer comprises, when viewed above the first surface, a first portion having flexibility of a first degree, and a second portion having flexibility of a second degree that is lower than the first degree.

3. The electronic device of claim 2, wherein the first portion of at least one of the first electrode layer or the second electrode layer comprises a conductive pattern of a first type, and
   wherein the second portion of the at least one of the first electrode layer or the second electrode layer comprises a conductive pattern of a second type.

4. The electronic device of claim 3, wherein the conductive pattern of the first type comprises a meandering pattern, a mesh pattern, or a pattern in which one wire is divided into a plurality of wires.

5. The electronic device of claim 3, wherein one width of the conductive pattern of the first type is larger than one width of the conductive pattern of the second type.

6. The electronic device of claim 2, wherein the first portion of the at least one of the first electrode layer, the second electrode layer, or the dielectric layer comprises a material different from that of the second portion at least in part.

7. The electronic device of claim 2, wherein a thickness of the first portion of at least one of the first electrode layer, the second electrode layer, or the dielectric layer in the second direction is smaller than a thickness of the second portion.

8. The electronic device of claim 2, wherein the pressure sensor comprises at least one support member contacting the first electrode layer or the second electrode layer, and
wherein the at least one support member comprises a first portion having the flexibility of the first degree, and a second portion having the flexibility of the second degree.

9. The electronic device of claim 8, wherein a thickness of the first portion of the at least one support member is smaller than a thickness of the second portion.

10. The electronic device of claim 2, wherein a flexible printed circuit board (FPCB) is arranged on the first portion of at least one of the first electrode layer, the second electrode layer, or the dielectric layer.

11. The electronic device of claim 1, wherein the housing comprises a first side that is extended by a first length in a third direction that intersects with the first and second directions, and a second side that is extended by a second length shorter than the first length in a fourth direction that intersects with the third direction,
wherein at least one of the recess, the opening, and the gap comprises a first side that is substantially parallel to the first side of the housing, and is extended by a third length, and a second side that is substantially parallel to the second side of the housing, and is extended by a fourth length, and
wherein the third length is shorter than the fourth length.

12. The electronic device of claim 1, wherein the housing comprises a first side that is extended by a first length in a third direction that intersects with the first and second directions, and a second side that is extended by a second length shorter than the first length in a fourth direction that intersects with the third direction,
wherein at least one of the recess, the opening, and the gap comprises a first side that is substantially parallel to the first side of the housing, and is extended by a third length, and a second side that is substantially parallel to the second side of the housing, and is extended by a fourth length, and
wherein the third length is longer than the fourth length.

13. The electronic device of claim 1, wherein the electronic device further comprises at least one hinge structure arranged between the first surface and the second surface of the housing, and configured to provide flexibility to the flexible portion of the housing, and
wherein the hinge structure is foldable about an axis of the flexible portion of the housing in the first direction or the second direction.

14. The electronic device of claim 1, wherein the plurality of sub pressure sensors are not overlapping the at least one flexible portion of the housing at least in part, when viewed above the first surface of the housing.

15. The electronic device of claim 1, wherein the electronic device further comprises at least one battery arranged between at least part of the pressure sensor and at least part of the second surface of the housing, and,
wherein the at least one battery comprises at least one flexible portion on a position corresponding to the flexible portion of the housing, when viewed above the first surface of the housing.

16. The electronic device of claim 1, wherein the electronic device further comprises at least one PCB arranged between at least part of the pressure sensor and at least part of the second surface of the housing, and,
wherein the at least one PCB includes at least one flexible portion on a position corresponding to the flexible portion of the housing, when viewed above the first surface of the housing.

* * * * *